United States Patent [19]

Shimizu et al.

[11] Patent Number: 5,608,824
[45] Date of Patent: Mar. 4, 1997

[54] IMAGE PROCESSING APPARATUS IN WHICH FILTERS HAVING DIFFERENT FILTERING CHARACTERISTICS CAN BE SWITCHED AMONG THEMSELVES

[75] Inventors: Kazuo Shimizu; Shigeru Kobayashi; Hideyuki Masuyama, all of Hachiouji; Shinji Aramaki, Kanagawa-ken, all of Japan

[73] Assignee: Olympus Optical Co., Ltd., Tokyo, Japan

[21] Appl. No.: 307,648

[22] PCT Filed: Jan. 17, 1994

[86] PCT No.: PCT/JP94/00055

§ 371 Date: Sep. 16, 1994

§ 102(e) Date: Sep. 16, 1994

[87] PCT Pub. No.: WO94/17484

PCT Pub. Date: Aug. 4, 1994

[30] Foreign Application Priority Data

| Jan. 22, 1993 | [JP] | Japan | 5-009244 |
| Feb. 3, 1993 | [JP] | Japan | 5-016520 |
| Mar. 15, 1993 | [JP] | Japan | 5-054046 |
| May 10, 1993 | [JP] | Japan | 5-108274 |
| May 17, 1993 | [JP] | Japan | 5-114834 |

[51] Int. Cl.⁶ ........................ G06K 9/36
[52] U.S. Cl. ........................ 382/276
[58] Field of Search ............ 382/260–265, 382/276–279, 272, 167, 303; 364/723, 724.05, 724.16, 724.19, 724.12, 728.01, 728.02, 754

[56] References Cited

U.S. PATENT DOCUMENTS

| 4,328,426 | 8/1980 | D'Ortenzio | 250/578 |
| 4,747,157 | 5/1988 | Kurakake et al. | 382/276 |
| 4,802,110 | 1/1989 | Richards et al. | 364/724.05 |
| 4,937,774 | 6/1990 | Malinowski | 364/724.12 |
| 4,984,286 | 1/1991 | Dolazza | 382/210 |
| 5,027,423 | 6/1991 | Kawata et al. | 382/254 |
| 5,151,953 | 9/1992 | Landeta | 382/276 |
| 5,163,018 | 10/1992 | Ikegaya et al. | 364/728.02 |
| 5,195,050 | 3/1993 | Hsu et al. | 364/728.01 |
| 5,311,459 | 5/1994 | D'Luna et al. | 364/754 |

FOREIGN PATENT DOCUMENTS

| 0517374A1 | 12/1992 | European Pat. Off. . |
| 61-201372 | 9/1986 | Japan . |
| 63-126075 | 5/1988 | Japan . |
| 2-244876 | 9/1990 | Japan . |
| 3-35663 | 2/1991 | Japan . |
| 3-240174 | 10/1991 | Japan . |
| WO90/16035 | 12/1990 | WIPO . |

OTHER PUBLICATIONS

Patent Abstracts of Japan, vol. 16, No. 267 (E–1217), Jun. 16, 1992 & JP–A–04 061 561 (NEC CORP.), Feb. 27, 1992.
Patent Abstracts of Japan, vol. 13, No. 396 (E–815), Sep. 4, 1989 & JP–A–01 140 807 (OKI ELECTRIC IND. CO.), Jun. 2, 1989.

*Primary Examiner*—Jose L. Couso
*Attorney, Agent, or Firm*—Frishauf, Holtz, Goodman, Langer & Chick

[57] ABSTRACT

An image processing apparatus comprising: a spatial filtering section storing coefficients arranged in i rows and j columns, for receiving pixel data items representing the input image and arranged in i rows and j columns, and for multiplying each pixel data item by a corresponding coefficient; a coefficient memory having groups of coefficient registers for storing the coefficients set in the spatial filtering section; a selection data generating section for generating coefficient-selecting data representing coefficients to be read from the coefficient registers of each group and for changing the coefficient-selecting data in accordance with the pixel data items which is to be input to the spatial filtering section; and a coefficient selecting section for receiving the coefficient-selecting data generated by the selecting data generating section, reading coefficients from the coefficient registers of each group in accordance with the coefficient-selecting data, and setting the coefficients in the spatial filtering section.

22 Claims, 29 Drawing Sheets

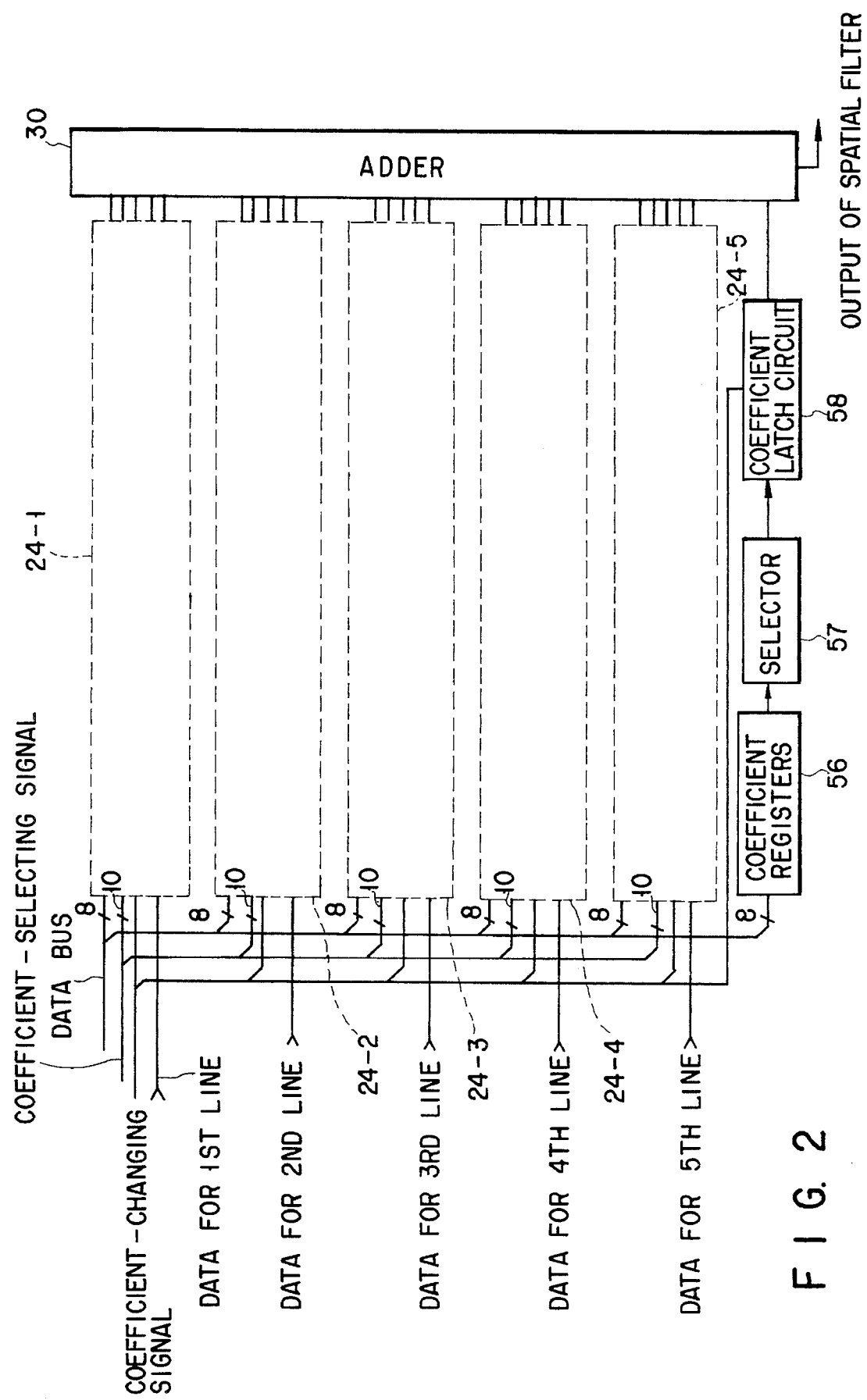
F I G. 2

| 1 | 0 | -2 | 0 | 1 |
|---|---|---|---|---|
| 0 | -2 | 1 | -2 | 0 |
| -2 | 1 | 9 | 1 | -2 |
| 0 | -2 | 1 | -2 | 0 |
| 1 | 0 | -2 | 0 | 1 |
F I G. 4A
| 2 | 3 | 1 | 3 | 2 |
|---|---|---|---|---|
| 3 | 1 | 2 | 1 | 3 |
| 1 | 2 | 4 | 2 | 1 |
| 3 | 1 | 2 | 1 | 3 |
| 2 | 3 | 1 | 3 | 2 |
F I G. 4B
F I G. 5A
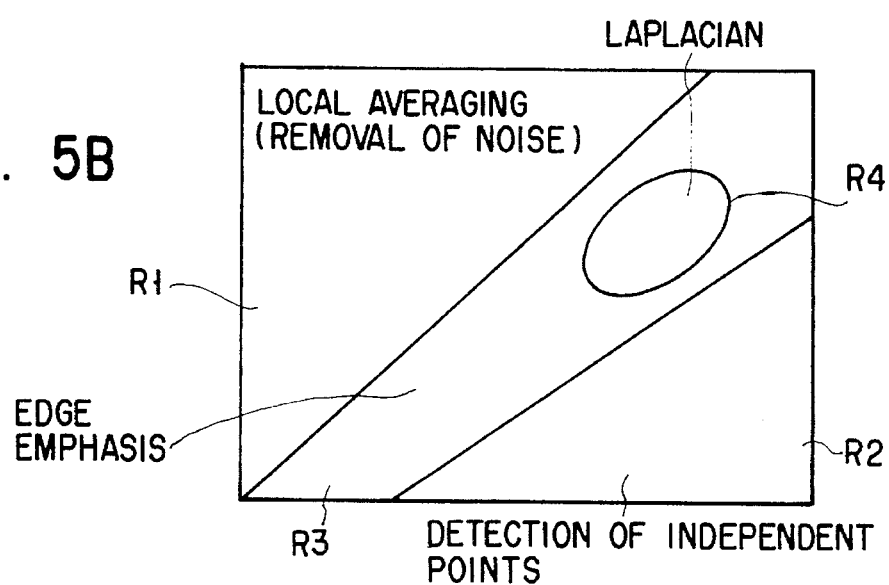
F I G. 5B

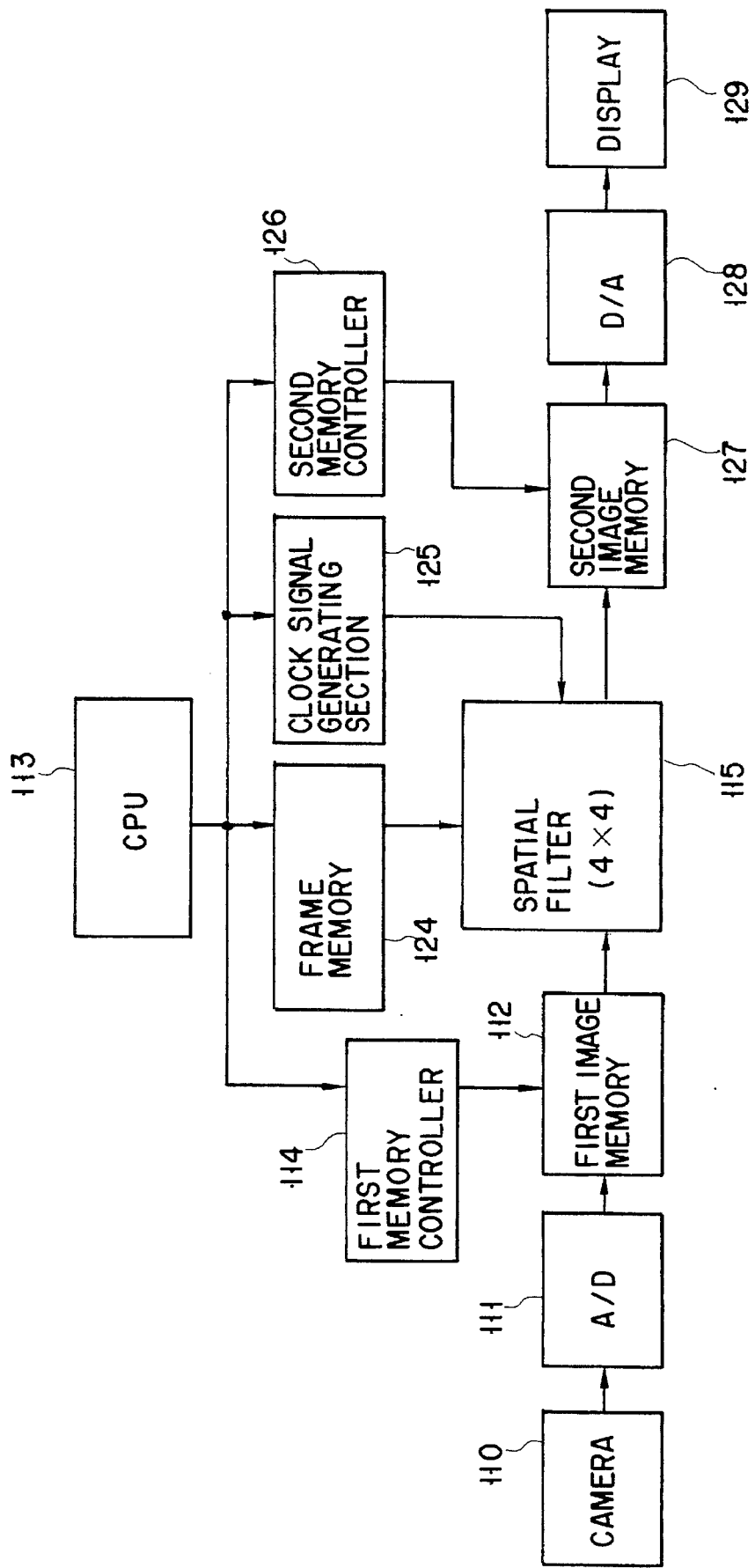
F I G. 6

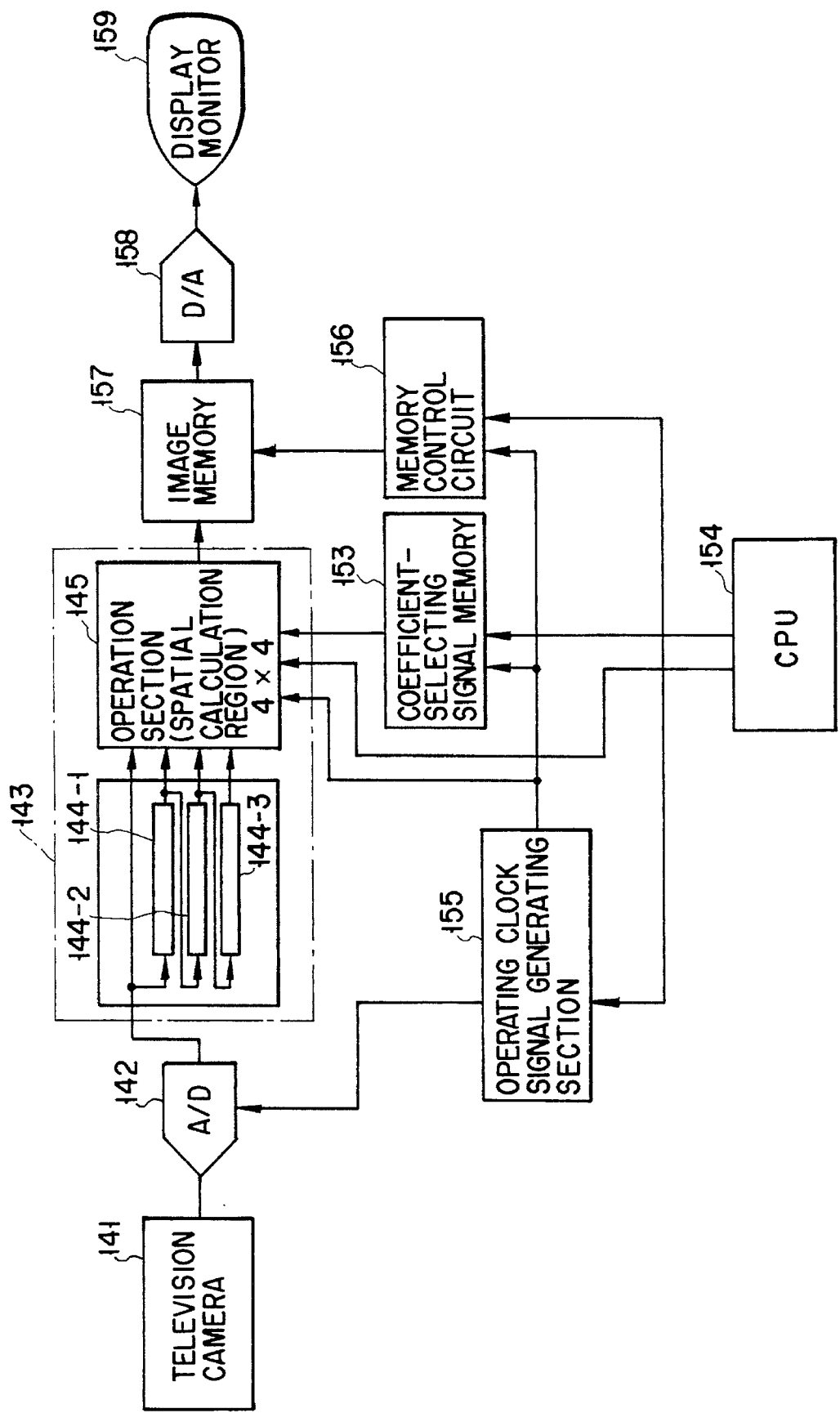
F I G. 12

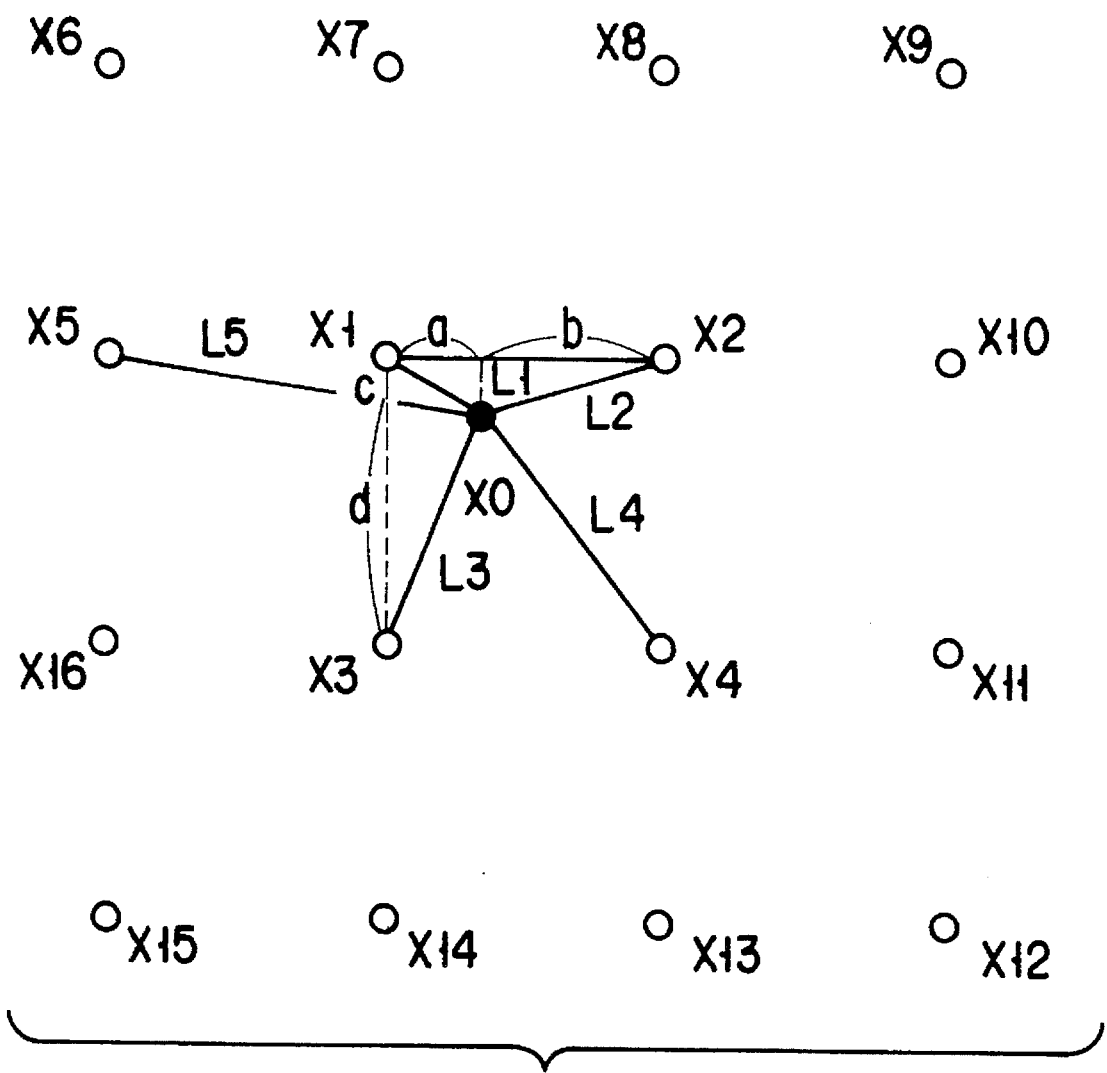
F I G. 13

| K6 | K7 | K8 | K9 |
|----|----|----|-----|
| K5 | K1 | K2 | K10 |
| K16 | K3 | K4 | K11 |
| K15 | K14 | K13 | K12 |

|  |  |  |  |
|---|---|---|---|
| 23 | 33 | 23 | 15 |
| 33 | 0 | 33 | 17 |
| 23 | 33 | 23 | 15 |
| 15 | 17 | 15 | 12 |

F I G. 16A

|  |  |  |  |
|---|---|---|---|
| 20 | 30 | 28 | 17 |
| 25 | 100 | 50 | 25 |
| 25 | 30 | 28 | 17 |
| 14 | 16 | 16 | 13 |

F I G. 16B

|  |  |  |  |
|---|---|---|---|
| 17 | 28 | 30 | 20 |
| 20 | 50 | 100 | 25 |
| 17 | 28 | 30 | 20 |
| 13 | 16 | 16 | 14 |

F I G. 16C

|  |  |  |  |
|---|---|---|---|
| 25 | 20 | 25 | 14 |
| 30 | 100 | 30 | 16 |
| 28 | 50 | 28 | 16 |
| 17 | 20 | 17 | 13 |

F I G. 16D

|  |  |  |  |
|---|---|---|---|
| 18 | 24 | 22 | 16 |
| 24 | 70 | 45 | 20 |
| 22 | 45 | 35 | 19 |
| 16 | 20 | 19 | 14 |

F I G. 16E

|  |  |  |  |
|---|---|---|---|
| 16 | 22 | 24 | 18 |
| 20 | 45 | 70 | 24 |
| 19 | 35 | 45 | 22 |
| 14 | 19 | 20 | 16 |

F I G. 16F

|  |  |  |  |
|---|---|---|---|
| 17 | 20 | 17 | 13 |
| 28 | 50 | 28 | 16 |
| 30 | 100 | 30 | 16 |
| 20 | 25 | 20 | 14 |

F I G. 16G

|  |  |  |  |
|---|---|---|---|
| 16 | 20 | 19 | 14 |
| 22 | 45 | 35 | 19 |
| 24 | 70 | 45 | 20 |
| 18 | 24 | 22 | 16 |

F I G. 16H

|  |  |  |  |
|---|---|---|---|
| 14 | 19 | 20 | 16 |
| 19 | 35 | 45 | 22 |
| 20 | 45 | 70 | 24 |
| 16 | 22 | 24 | 18 |

F I G. 16I

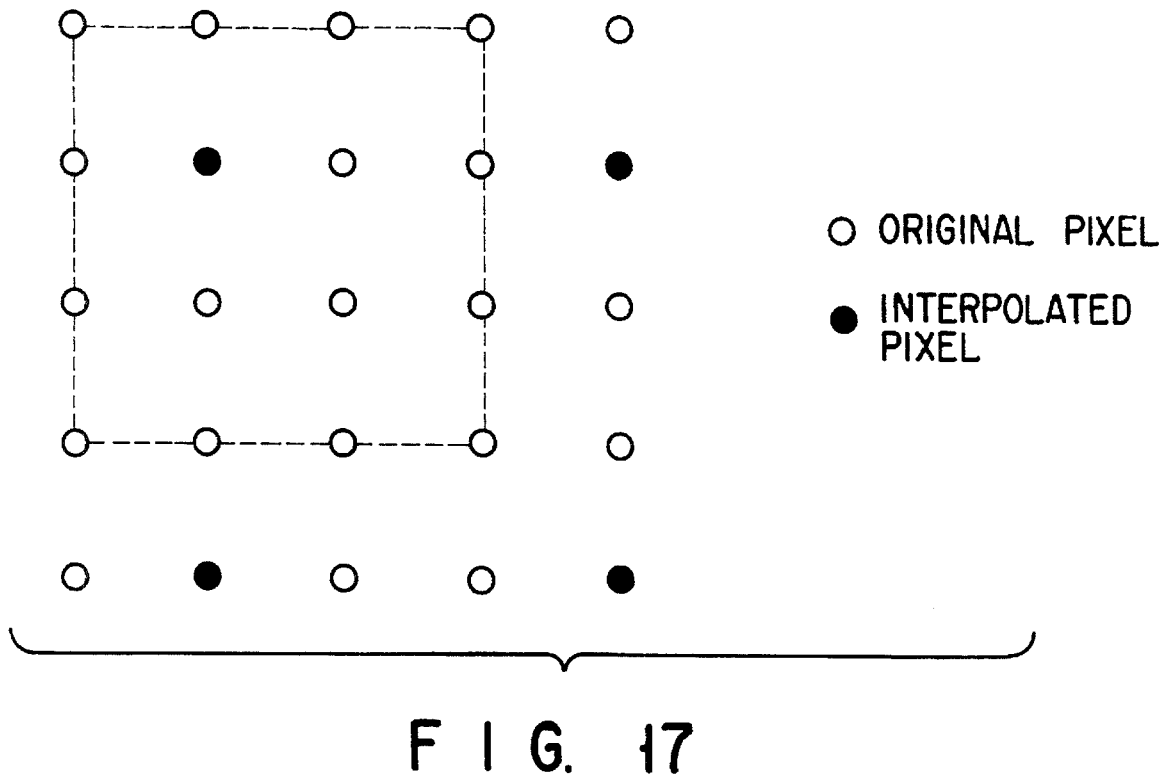
F I G. 17
F I G. 18

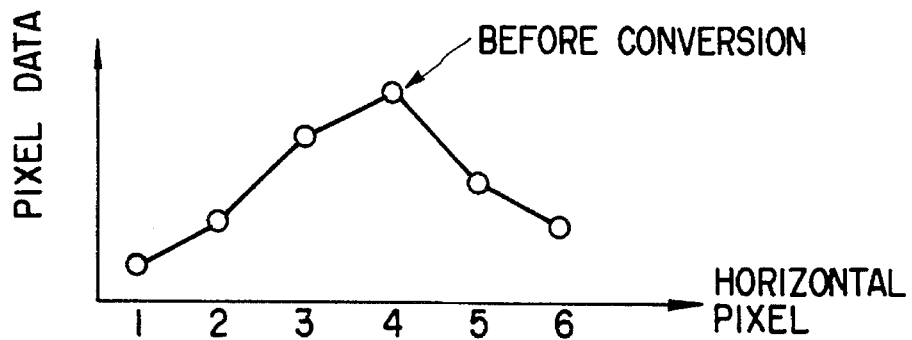
F I G. 19A
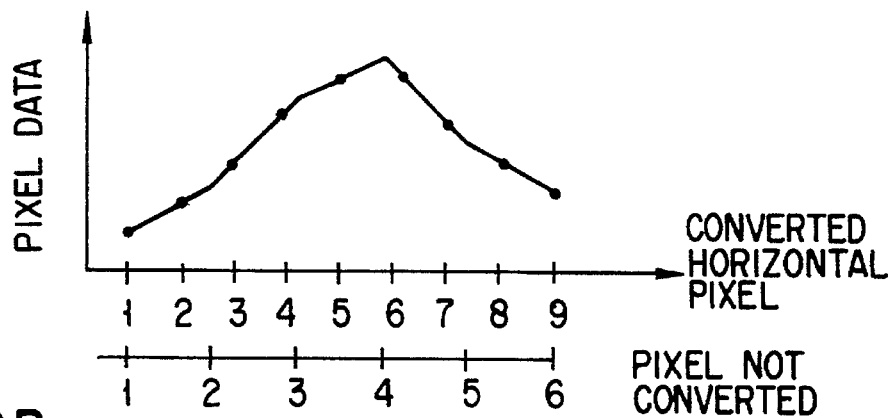
F I G. 19B
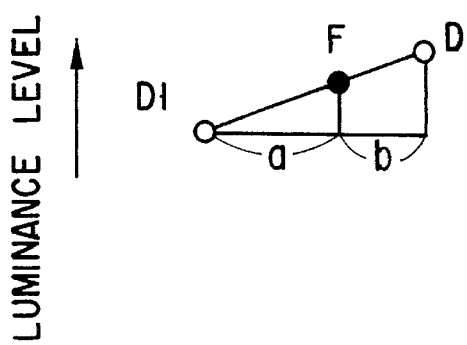
F I G. 19C

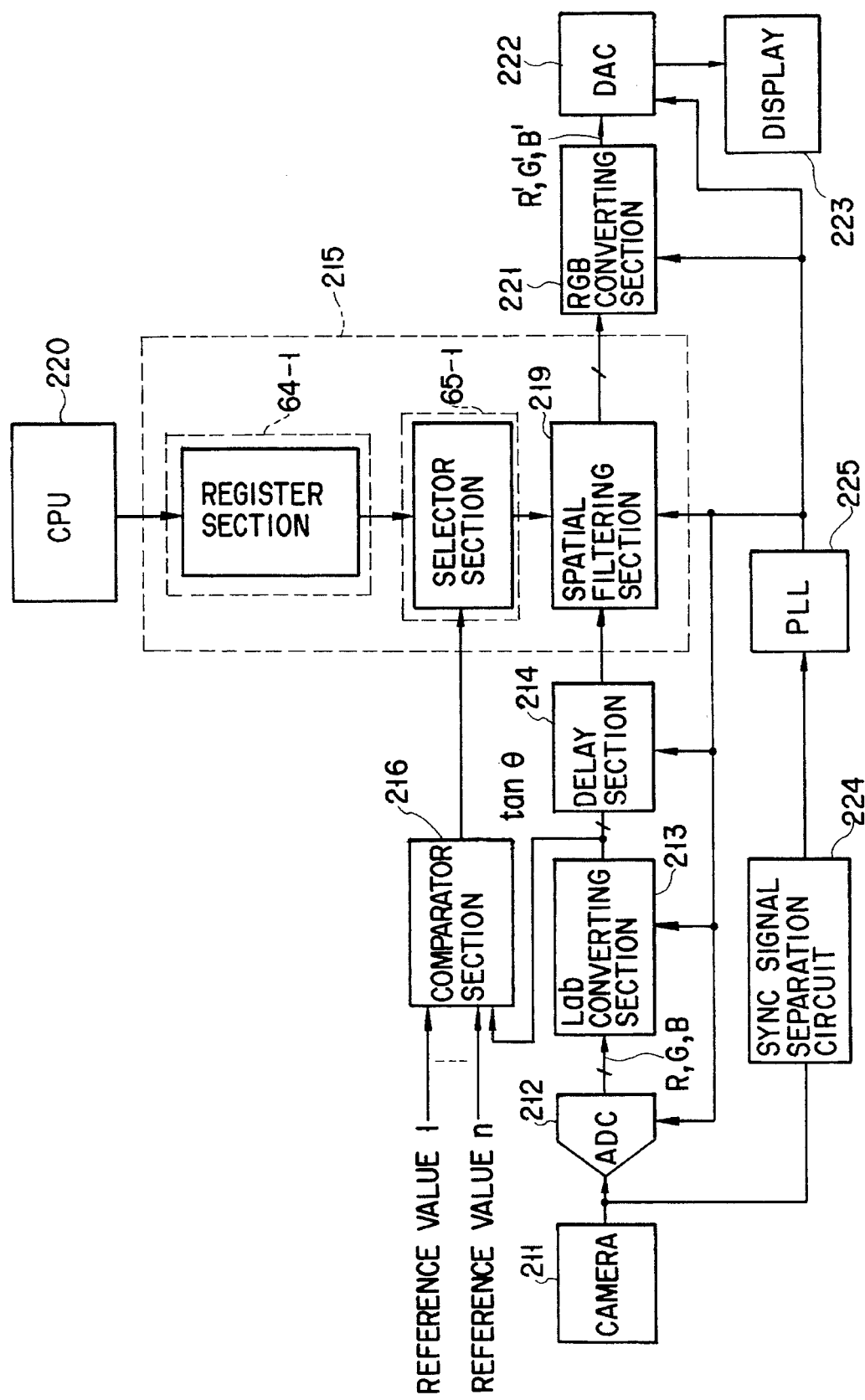
F I G. 20

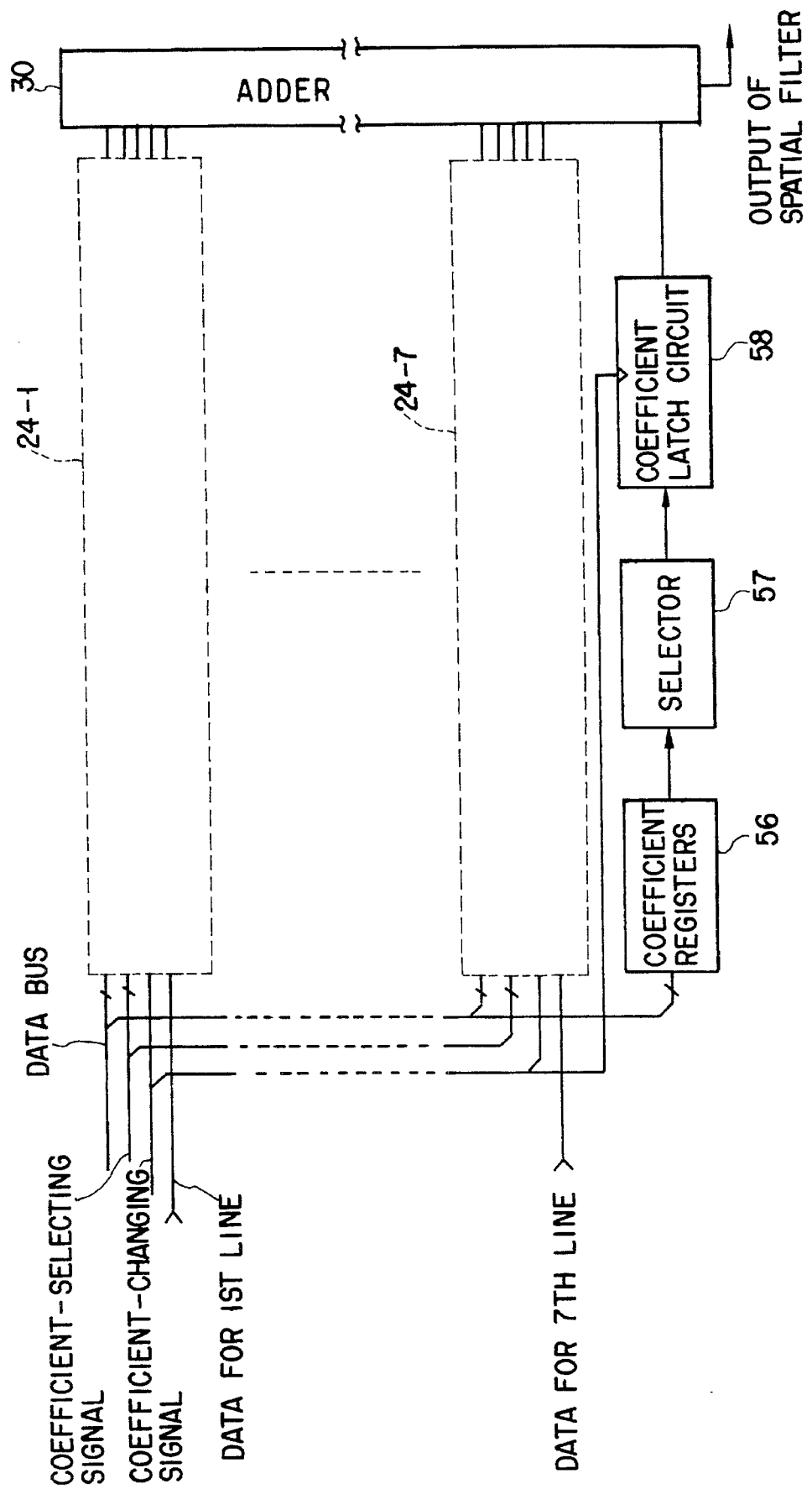
F I G. 22

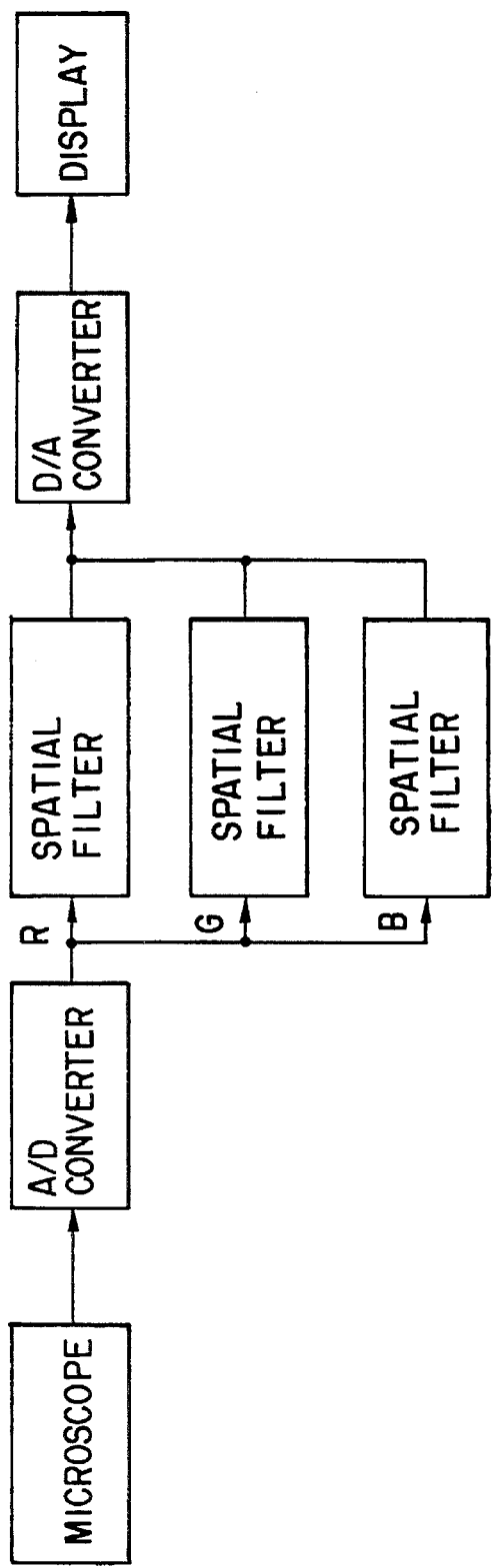
F I G. 26A
F I G. 26B

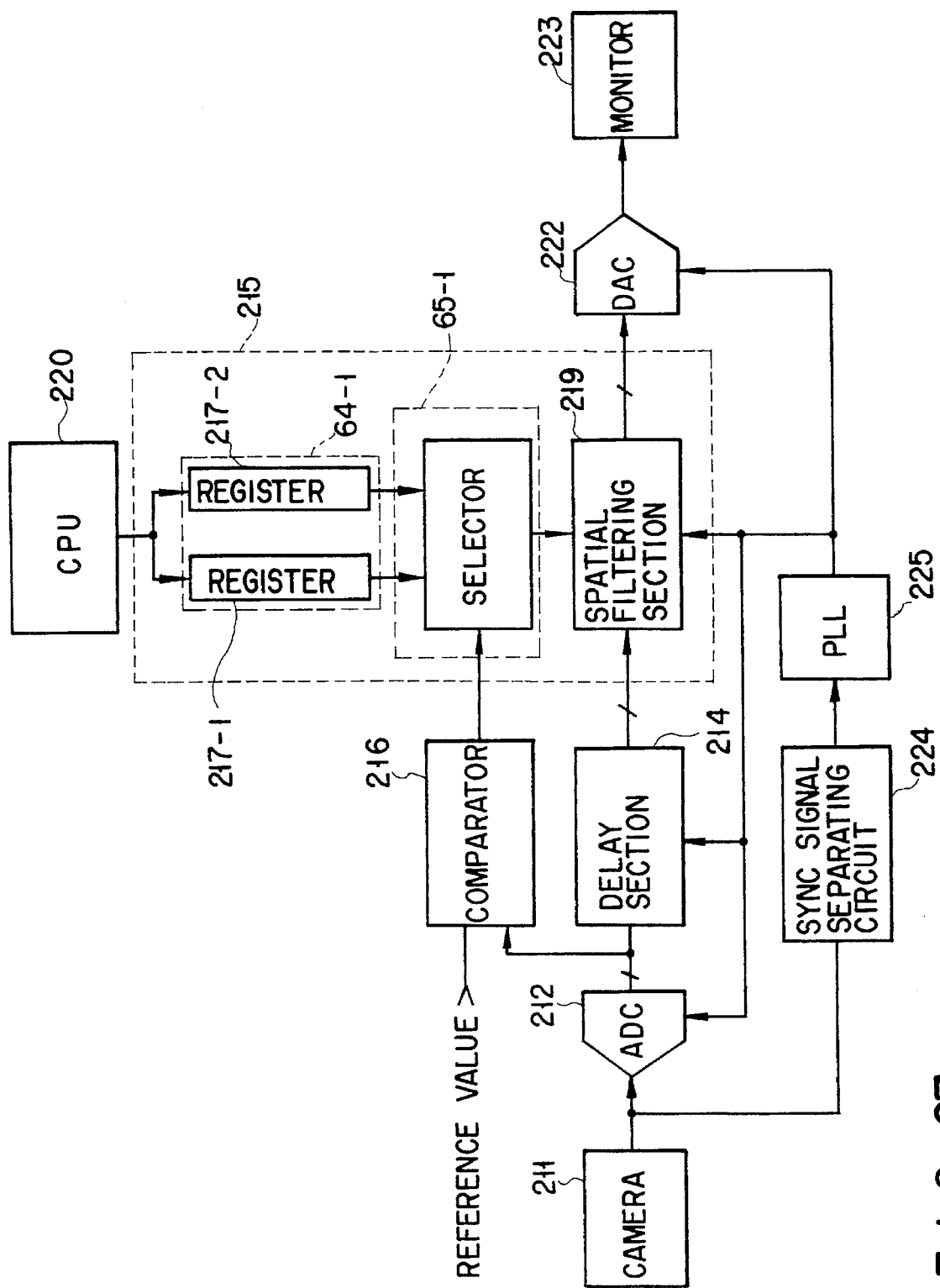
F I G. 27

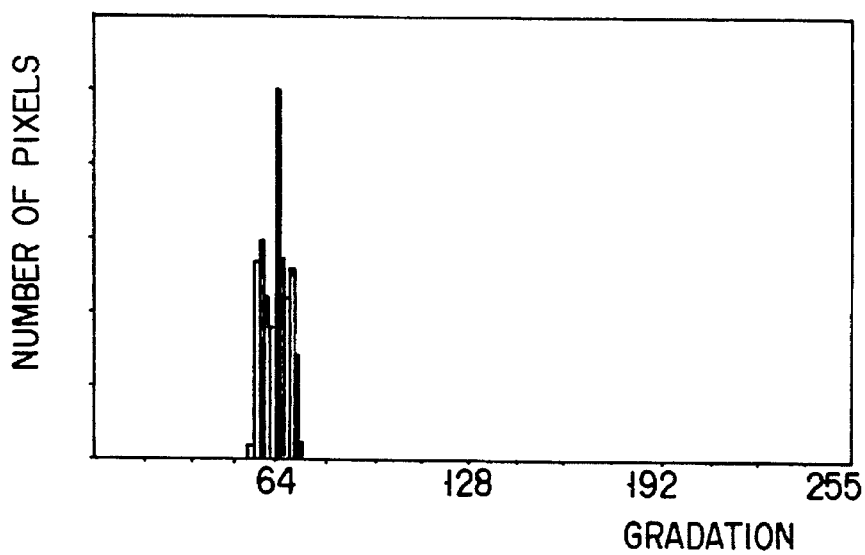
F I G. 28
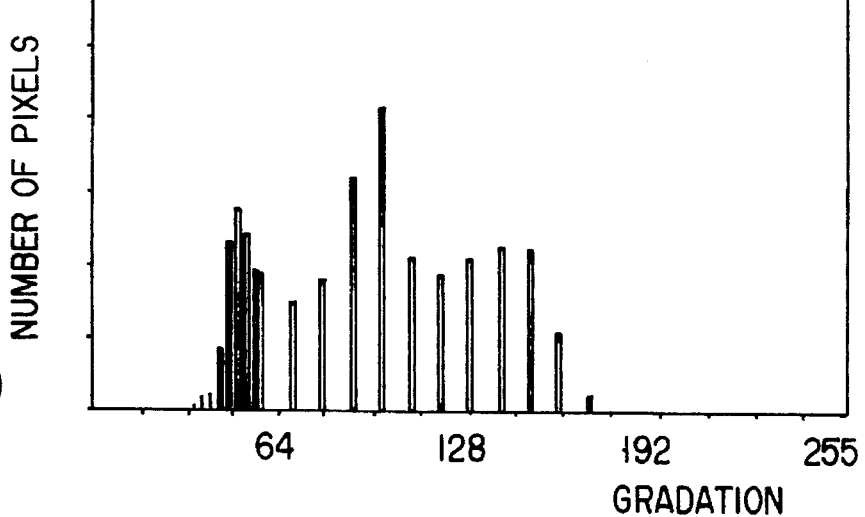
F I G. 29
F I G. 30
| 0 | 0 | 0 | -1 | 0 | 0 | 0 |
|---|---|---|----|---|---|---|
| 0 | 1 | 1 | 1 | 1 | 1 | 0 |
| 0 | 1 | 2 | 2 | 2 | 1 | 0 |
| -1 | 1 | 2 | 4 | 2 | 1 | -1 |
| 0 | 1 | 2 | 2 | 2 | 1 | 0 |
| 0 | 1 | 1 | 1 | 1 | 1 | 0 |
| 0 | 0 | 0 | -1 | 0 | 0 | 0 |

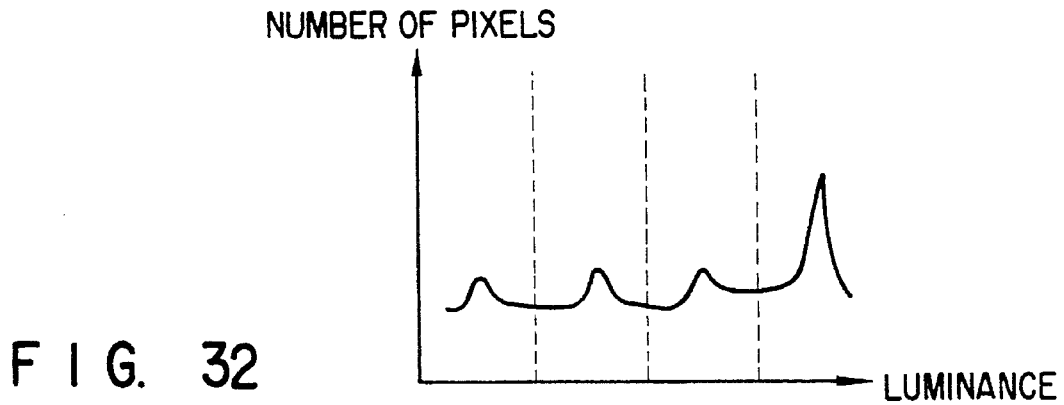
F I G. 32
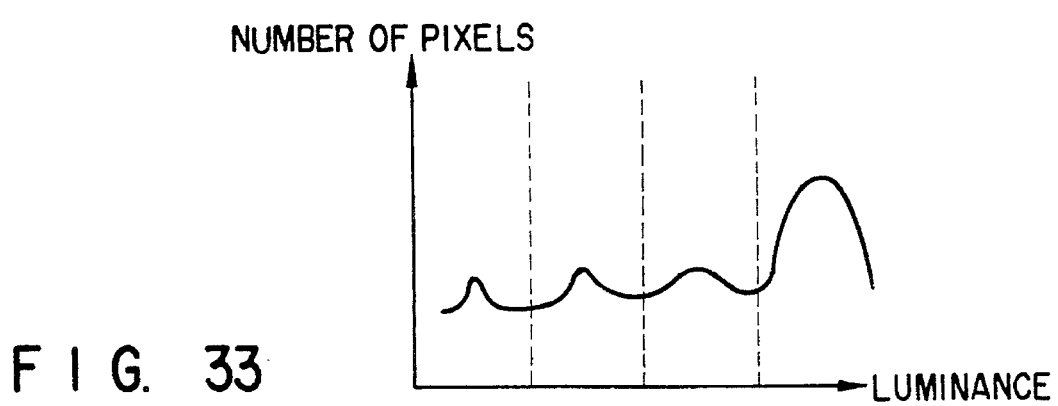
F I G. 33
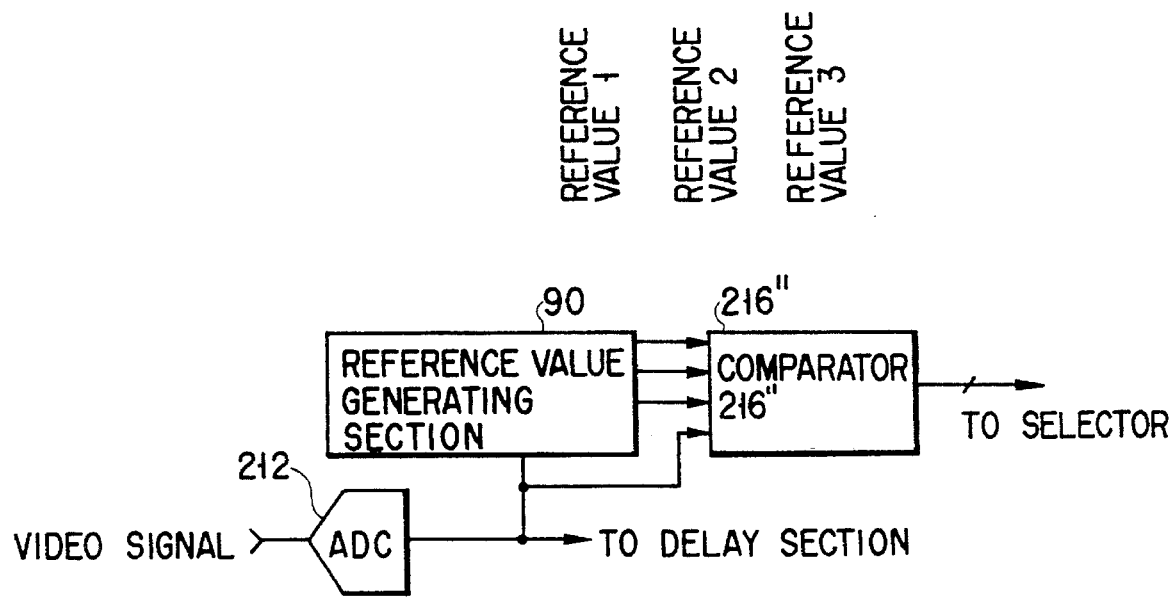
F I G. 34

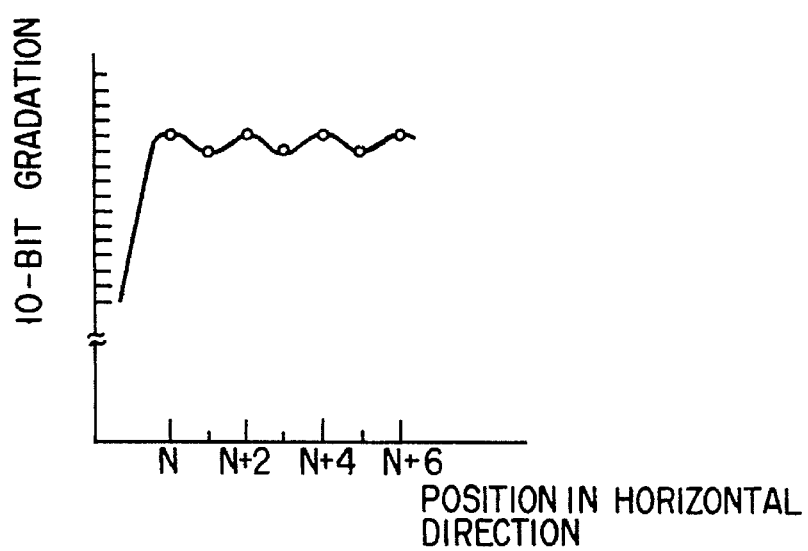
F I G. 36A
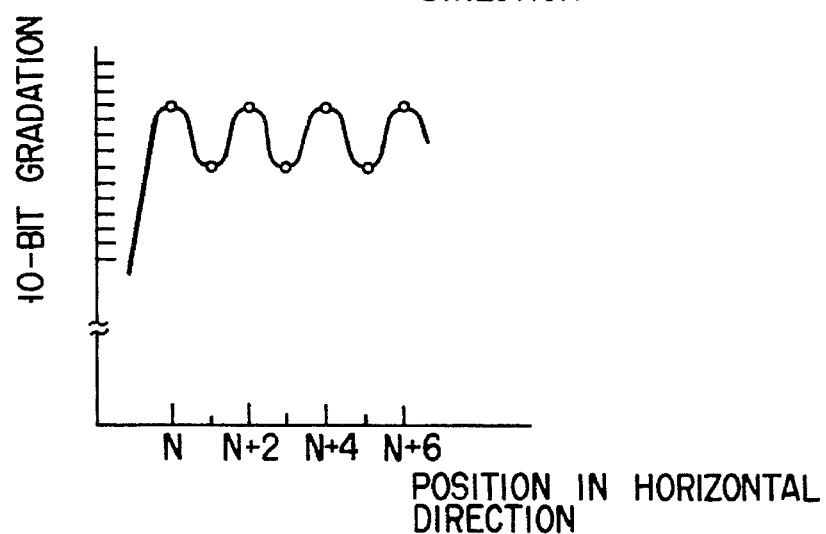
F I G. 36B
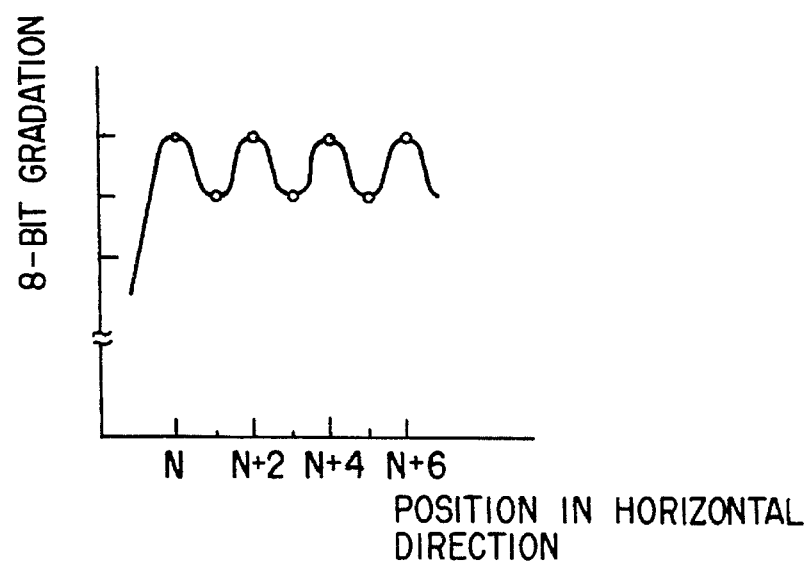
F I G. 36C

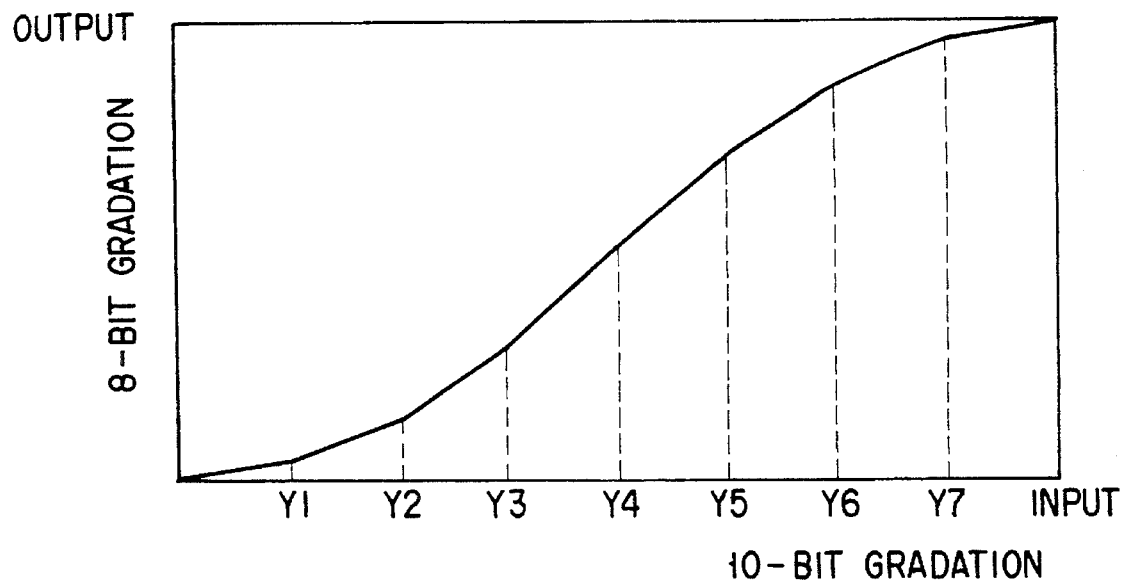
F I G. 37
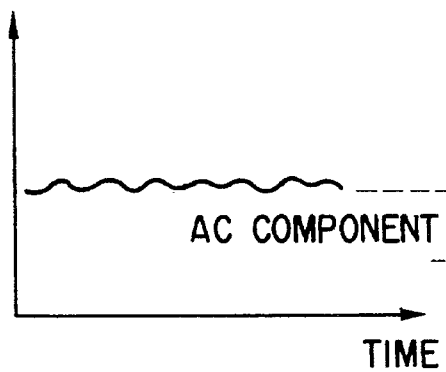
F I G. 38A
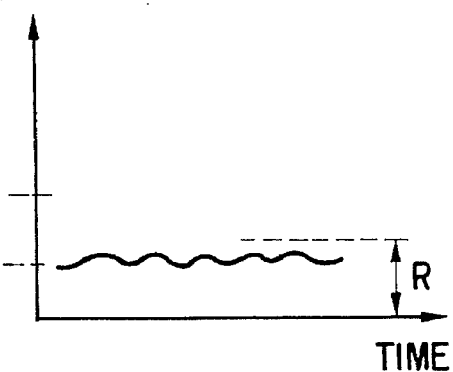
F I G. 38B
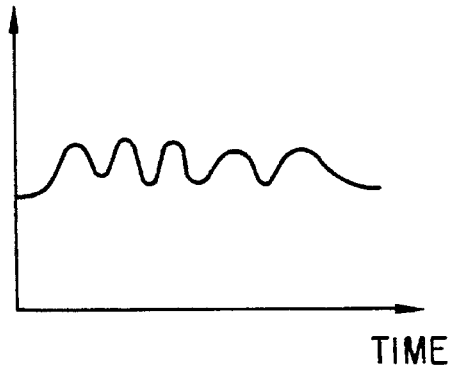
F I G. 38C

IMAGE PROCESSING APPARATUS IN WHICH FILTERS HAVING DIFFERENT FILTERING CHARACTERISTICS CAN BE SWITCHED AMONG THEMSELVES

TECHNICAL FIELD

The present invention relates to an image processing apparatus for performing a process (for example, interpolation, shading, pattern recognition, correction of gradation, enlarging, reducing) on a region (at least one pixel) of an input image, by using a spatial filter.

BACKGROUND ART

Hitherto known is an image processing apparatus which has a spatial filter which can be represented by a matrix of i rows and j columns. The spatial filter used in the image processing apparatus can have a desired filtering function, if a given coefficient is set in it. Depending on the pattern of the coefficient set in it, the spatial filter can perform a process, such as edge-emphasizing or noise-removing, on the input image.

FIG. 39 shows a spatial filter of the type incorporated in such an image processing apparatus.

The spatial filter shown in FIG. 39 comprises a 3×3 matrix. Each row of the matrix has data latch circuits 1 to 3 which are connected in series for sequentially latching pixel data items for the corresponding line. The pixel data items latched by the data latch circuits 1 to 3 are supplied to multiplying sections 4 to 6, respectively. Each of the sections 4 to 6 multiplies the pixel data item by a predetermined coefficient. The coefficients set to the multiplying sections 4 to 6 are stored in coefficient registers 7 to 9. They are supplied to the multiplying sections 4 to 6 through coefficient latch circuits 11 to 13, respectively.

Pixel data for the first line is input to the first-stage line 14. Pixel data for the second line is input to the second-stage line 15, and pixel data for the third line to the third-stage line 16. The product of the pixel value latched by each data latch and the coefficient stored in the corresponding coefficient register is input to an adder 17. The adder 17 adds the nine products input to it, and outputs the sum as the output of the spatial filter.

In the spatial filter of this structure, a frame image data is input three consecutive lines 14 to 16. The data is shifted by one pixel in each line. The pixel data for one line is thereby spatially filtered.

In the case of a 3×3 matrix filter, the pixel data processed by a single multiplication-addition operation represents the pixel located at the center of the matrix (i.e., the intersection of the second row and the second column).

Upon completion of the processing for one line, the line data input to the first to third lines 14 to 16 is shifted upwards or downwards by one line or more lines, and the image data for one line is processed again.

The spatial filter described above can perform image-processing functions such as local averaging, differentiation, edge-detection and the like, in accordance with the coefficients stored in the coefficient registers 7 to 9.

The coefficient registers 7 to 9 of the spatial filter are connected to the data bus of a CPU (not shown). Hence, the coefficients stored in the registers 7 to 9 can be rewritten by the CUP via the data bus.

In the conventional spatial filter, to rewrite the coefficients stored in the coefficient registers as described above, the CPU needs to make access to all coefficient registers through the data bus and to rewrite the coefficient stored in each register. If the spatial filter comprises a 3×3 matrix, the coefficient-rewriting operation must be repeated nine times. If the spatial filter comprises a 5×5 matrix, the coefficient-rewriting operation must be repeated 15 times. Therefore, with the conventional image processing apparatus it is required that the coefficients set in the spatial filter be switched, usually for every frame.

In actual image processing, however, it is demanded that a spatial filter be used which is set at a given coefficient for any desired region of a frame, and that various types of spatial filters be used for processing one frame. Such switching of filters can hardly be accomplished by using the functions of an ordinary personal computer.

DISCLOSURE OF THE INVENTION

In view of the foregoing, the present invention has been made. An object of the invention is to provide an image processing apparatus wherein the coefficients set in the spatial filter can be changed easily and fast.

Another object of the present invention is to provide an image processing apparatus which can perform, at high speed, interpolation correlated in horizontal direction and vertical direction, by using a spatial filter in which coefficients can be changed easily and fast, and which can serve to display an image such as a moving picture on a high-resolution monitor having a large number of pixels and also display a high-resolution image on a monitor having a small number of pixels.

Still another object of the present invention is to provide an image processing apparatus which can carry out interpolation on surrounding pixels in accordance with a given conversion ratio, by using a spatial filter in which coefficients can be changed easily and fast, and which can prevent unnatural conversion of an image which may occur in conversion process or solve a problem accompanying unnatural conversion of an image, such as deterioration of image quality, thereby to provide a natural image correlated with the surrounding pixels.

Another object of the present invention is to provide an image processing apparatus which can perform filtering on an input image in accordance with the hue of the input image and which can change the mode of filtering for each pixel of the input image, by using a spatial filter in which coefficients can be changed easily and fast.

A further object of the present invention is to provide an image processing apparatus which can adjust gradation to the characteristics of human visual perception and which can achieve filtering effect, by using a spatial filter in which coefficients can be changed easily and fast.

An image processing apparatus according to the present invention performs spatial processing on an input image. The apparatus comprises: a spatial filtering section storing coefficients arranged in i rows and j columns, for receiving pixel data items representing the input image and arranged in i rows and j columns, multiplying each pixel data item by a corresponding coefficient, thereby to perform spatial filtering, and extracting a particular frequency component of the input image; a coefficient memory having a plurality of groups of coefficient registers corresponding to i×j coefficients to be set in the spatial filtering section, the coefficient registers of each group storing many types of coefficients; a selection data generating section for generating coefficient-selecting data representing coefficients to be read from the coefficient registers of each group and changing the coefficient-selecting data in accordance with the pixel data items which is to be input to the spatial filtering section; and a coefficient selecting circuit for receiving the coefficient-selecting data generated by the selecting data generating section, reading coefficients from the coefficient registers of each group in accordance with the coefficient-selecting data, and setting the coefficients in the spatial filtering section.

In the apparatus thus constructed, the selecting data generating section generates coefficient-selecting data assigned to a part formed of pixels, in synchronization with the inputting of the pixel data items representing the pixels. The coefficient-selecting data is supplied to a coefficient setting circuit. The coefficients are read from the coefficient register groups in accordance with the coefficient-selecting data and set in the spatial filtering section.

In the image processing apparatus according to the present invention, the selecting data generating section has a coefficient data storing memory and a coefficient reading circuit. The coefficient memory stores a plurality of types of coefficient-selecting data items, each of which is provided for at least one pixel of a spatial region of the input image. The coefficient reading circuit reads the coefficient-selecting data item corresponding to a pixel data item to be processed by the spatial filtering section, from the coefficient memory at the same time the input image is supplied to the spatial filtering section.

The coefficient-selecting data items for the input image are stored in the coefficient memory stores, each corresponding to at least one pixel of a region of the input image. The coefficient reading circuit reads the coefficient-selecting data items from the coefficient memory at the same time the input image is supplied to the spatial filtering section, and inputs them to the coefficient setting circuit. The coefficient setting circuit reads the coefficients corresponding to the coefficient-selecting data items, from each coefficient register group, and sets them in the spatial filtering section.

Therefore, each coefficient in the spatial filtering section is changed for at least one pixel of a region of the input image. A filter can be set for any given region of the input image, or various types of filters for the entire image.

Another image processing apparatus of this invention comprises a clock signal generating circuit and an image memory and a controller, besides the spatial filtering section, the coefficient memory and the coefficient setting means. The clock signal generating circuit supplies operation clock signals to the spatial filtering section, thereby to cause the spatial filtering section to perform spatial filtering, and changes operation clock signals supplied to the spatial filtering section in accordance with a ratio at which to enlarge or reduce pixel data to be processed by the spatial filtering section. The image memory is provided to store the results of the process performed by the spatial filtering section. The controller controls the writing of pixel data into, and the reading of pixel data from, the image memory. The spatial filtering section changes the coefficients arranged in i rows and j columns, in synchronization with the operation clock signals. It multiplies those of the pixel data items arranged in i rows and j columns which are required for interpolation, by the coefficients corresponding to the pixel data items, and adds these pixel data items, thereby generating new interpolated data representing one pixel.

The apparatus performs interpolation not only on adjacent pixels but also on surrounding pixels, in accordance with a given ratio at which to enlarge or reduce the input image. The apparatus can therefore provide a natural image well correlated with the surrounding pixels, regardless of the ratio of enlarging or reducing the input image.

The apparatus makes it possible to display an image faithful to the original image, not deteriorated no matter whether it is an enlarged one or a reduced one.

Still another image processing apparatus of this invention comprises a first conversion section and a second conversion section, besides the spatial filtering section, the coefficient memory and the coefficient setting means. The first conversion section converts a color image signal of an input image to a color-system signal. The second conversion section converts pixel data which the spatial filtering means has obtained by filtering the color-system signal, into the original color image signal, In this apparatus, the spatial filtering section receives the color-system signal from said first conversion section, in the form of pixel data items arranged in i rows and j columns, and the selection data generating section generates coefficient-selecting data in accordance with a hue parameter which changes based on the hue of the input image represented by the color-system signal output from the first conversion section.

The color-system signal the first conversion section has generated from the color image signal is input to the spatial filtering section. The signal corresponding to the hue component of the color-system signal is input to the selection data generating section. Of the coefficient patterns stored in the coefficient memory based on the coefficient-selecting data output from the selecting data generating section, the coefficient pattern to be set in the spatial filtering section is determined from the hue parameter of the input image.

Another image processing apparatus of this invention comprises a comparator, besides the spatial filtering section, the coefficient memory and the coefficient setting means. The comparator detects the luminance value of pixel data to be input to said spatial filtering section, and compares the luminance value with at least one preset reference value. The coefficient selecting data generating section generates a coefficient-selecting data item for a high-luminance part of the input image and a coefficient-selecting data item for a low-luminance part of the input image.

In this apparatus, the comparator detects the low-luminance part and high-luminance part of the input image, and generates two coefficient-selecting data items for the low-luminance part and high-luminance parts of the input image, respectively. The coefficient selecting circuit reads coefficients from the coefficient memory in accordance with the coefficient-selecting data items, and supplies the coefficients to the spatial filtering section. The spatial filtering section can therefore correct the gradations of the low- and high-luminance parts of the input image to different degrees. Since the filtering achieved is a spatial one which is linear conversion, the image data can be preserved well.

Still another image processing apparatus of this invention comprises a comparator and a gradation compressing circuit, besides the spatial filtering section, the coefficient memory and the coefficient setting means. The comparator detects the luminance value of pixel data to be input to said spatial filtering section, and compares the luminance value with at least one preset reference value. The gradation compressing circuit performs gradation compression on the pixel data output from the spatial filtering section. The comparator generates the coefficient-selecting data from the result of comparison.

In the apparatus thus constructed, a coefficient pattern corresponding to the luminance value of the image signal is set in the spatial filtering section, and the data filtered with the coefficients forming the coefficient pattern is gradation-compressed by the gradation compressing circuit. Hence, a high-luminance part and a low-luminance part, which are likely to have their gradation information deteriorated when gradation-compressed, can be compressed in terms of gradation, without having their gradation information deteriorated, provided that the coefficient pattern set in the spatial filtering section is a gradation-emphasized one.

BRIEF DESCRIPTION OF THE DRAWINGS

FIG. 2 is an overall view of the spatial filter incorporated in the image processing apparatus which is the first embodiment;

FIG. 4A is a diagram showing the coefficients set in a 5×5 spatial filter;

FIG. 4B is a diagram showing the numbers for setting the coefficients;

FIG. 5A is a diagram illustrating a microphotographic image;

FIG. 5B is a diagram explaining how the microphotographic image is divided into regions in accordance with coefficients;

FIG. 6 is a function block diagram showing an image processing apparatus which is a second embodiment of the present invention;

FIG. 12 is a function block diagram showing the image processing apparatus which is the third embodiment;

FIG. 13 is a diagram representing the correlation between a 4×4 original pixel matrix and a pixel matrix generated by means of interpolation;

FIGS. 16A to 16I show nine coefficient patterns which are used to enlarge an original image three times;

FIG. 17 is a diagram illustrating the relation which the pixels of an original image and interpolated pixels have when the original image is reduced three times;

FIG. 18 shows a coefficient pattern used to reduce the number of data items to one-ninth;

FIG. 19A is a diagram showing pixel data items before the image-enlarging or -reducing ratio is changed;

FIG. 19B is a diagram showing the pixel data items after the image-enlarging or -reducing ratio has been changed in horizontal direction;

FIG. 19C is a diagram representing an operation model for calculating luminance;

FIG. 20 is an overall view of an image processing apparatus which is a fourth embodiment of the present invention;

FIG. 22 is a diagram illustrating the spatial filter unit;

FIG. 26A is a diagram showing a system for filtering R, G and B signals;

FIG. 26B is a diagram illustrating another system for filtering an NTSC signal;

FIG. 27 is a function block diagram showing an image processing apparatus which is a fifth embodiment;

FIG. 28 is a diagram representing the luminance distribution which an input image has before gradation is corrected;

FIG. 29 is a diagram representing the luminance distribution which the input image has after gradation has been corrected;

FIG. 30 is a diagram showing the coefficients set in the spatial filtering section of the image processing apparatus which is the fifth embodiment;

FIG. 32 is a diagram representing the luminance distribution which an input image has in a second modification of the image processing apparatus which is the fifth embodiment;

FIG. 33 is a diagram representing the luminance distribution which the input image has after gradation has been corrected in the second modification of the fifth embodiment;

FIG. 34 is a diagram illustrating a modification of the second modification of the fifth embodiment;

FIGS. 36A to 36C are diagrams explaining how the gradation of an input image changes in the sixth embodiment;

FIG. 37 shows a conversion table for use in compressing gradation;

FIGS. 38A to 38C are diagrams for explaining the conventional method of correcting gradation.

BEST MODE OF CARRYING OUT THE INVENTION

Embodiments of the present invention will now be described.

Figure 1:
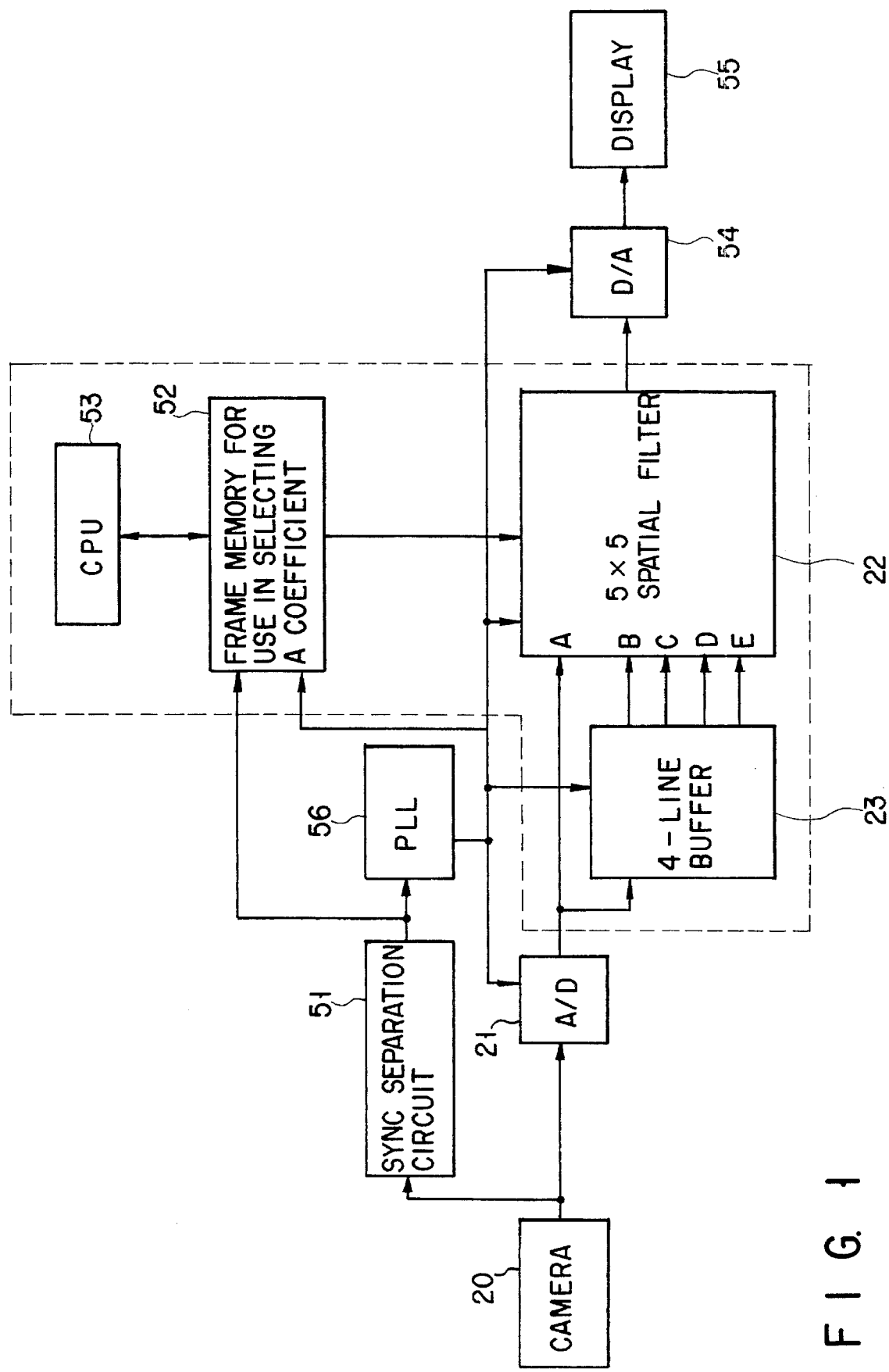
FIG. 1 is a function block diagram showing an image processing apparatus which is a first embodiment of the present invention.

FIG. 1 is a function block diagram showing the image processing apparatus which is a first embodiment of the present invention. In the image processing apparatus according to this embodiment, an image input from a camera 20 is supplied to an A/D converter 21. The pixels forming the image are sequentially converted into pixel data items by the A/D converter 21, first the first pixel of the first line. A 5×5 spatial filter 22 and a 4-line buffer 23 are connected to the output terminal of the A/D converter 21.

The 4-line buffer 23 comprises four line buffers, each designed to delay, by one line, the pixel data items output from the A/D converter 21. The first line buffer supplies a pixel data item, delayed by one line, to the first data latch circuit for the second line of the spatial filter 22, and also to the input terminal of the second line buffer. The second line buffer supplies a pixel data item, delayed by one line, to the first data latch circuit for the third line of the spatial filter 22, and also to the input terminal of the third line buffer. The third line buffer supplies a pixel data item, delayed by one line, to the first data latch circuit for the fourth line of the spatial filter 22, and also to the input terminal of the fourth line buffer. The fourth line buffer supplies a pixel data item, delayed by one line, to the first data latch circuit for the fifth line of the spatial filter 22. In other words, adjacent five of pixel data items representing the input image, which are for five rows and the same column, are latched by the first data latch circuits for the five lines.

FIG. 2 is an overall view of the spatial filter 22. The spatial filter 22 is divided into five blocks 24-1 to 24-5. The first block 24-1 directly receives the image data output from the A/D converter 21. The second to fifth blocks 24-2 to 24-5 receive the four pixel data items for the first to fourth lines, which have been sequentially delayed. The first to fifth blocks 24-1 to 24-5 have the same internal structure.

Figure 3:
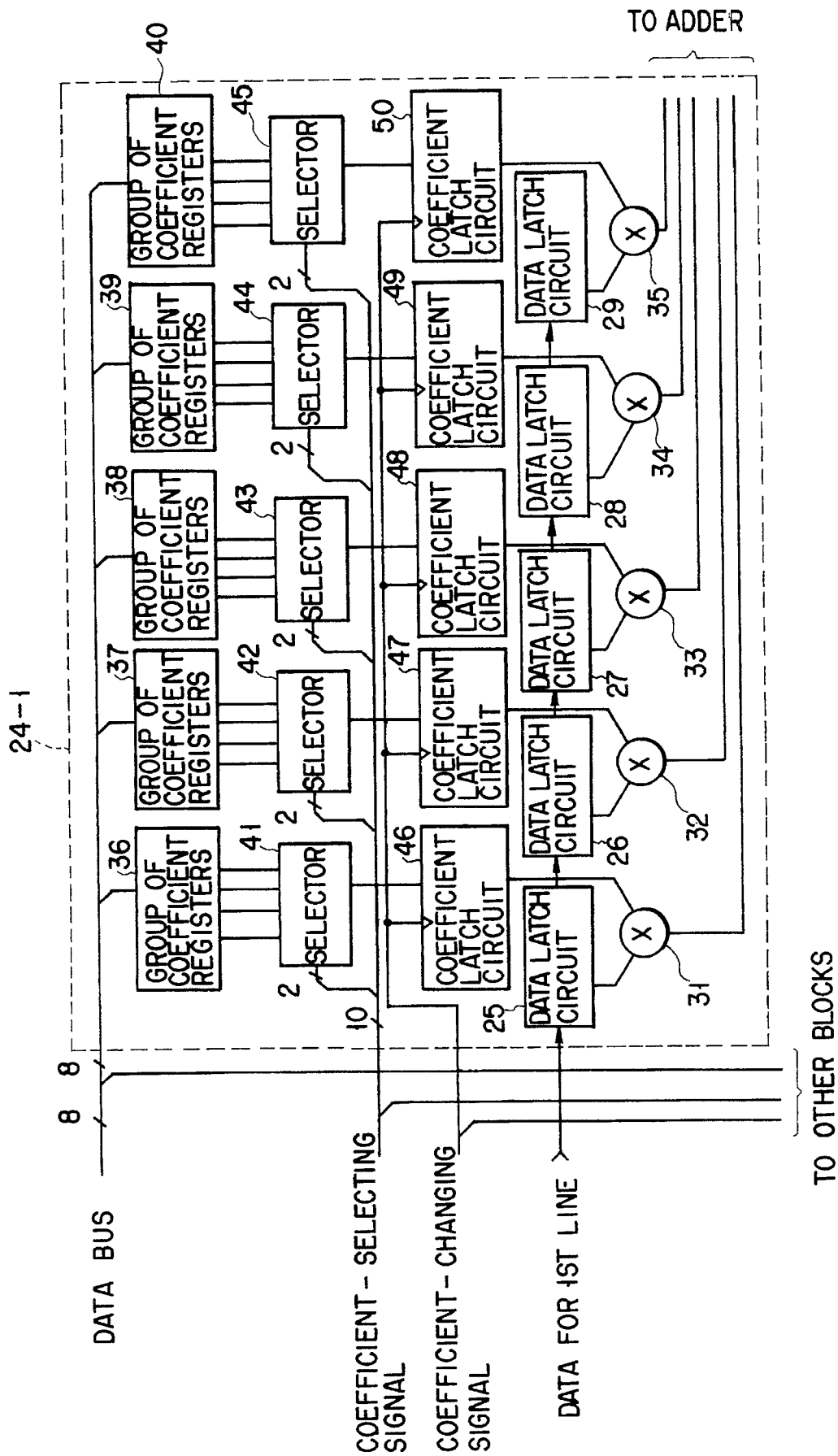
FIG. 3 is a diagram showing the first block of the spatial filter.

FIG. 3 shows the internal structure of the first block 24-1. The first block 24-1 comprises five data latch circuits 25 to 29 which are connected in series, forming one line. The data latch circuit 25, located near the input end of this line, directly receives the pixel data item from the A/D converter 21. The pixel data item is transferred to the data latch circuits 25 to 29 sequentially, in synchronization with an operating clock signal. As a result, consecutive five pixel data items are held in the line.

Five multipliers 31 to 35 are provided; they are associated with the data latch circuits 25 to 29, respectively. Each multiplier multiplies the pixel data item latched by the associated data latch circuit by a coefficient set in it. The products output by the multipliers 31 to 35 are input to an adder 30.

Groups 36 to 40 of coefficient registers are provided; they are associated with the multipliers 31 to 35, respectively. Each group consists of four registers, in which different coefficients are set. The coefficients have been set in the groups 36 to 40 of registers from a CPU through a data bus, as will be described later.

Selectors 41 to 45 are provided; they are associated with the groups 36 to 40 of coefficient registers, respectively. Each selector is connected to all registers of the associated group, for selecting the coefficient set in one of the four registers of the group in accordance with a coefficient-selecting signal supplied externally.

The coefficients which the selectors 41 to 45 have selected are supplied the multipliers 31 to 35 through coefficient latch circuits 45 to 50 provided for the selectors 41 to 45, respectively.

Four different coefficients are stored in the first to fourth registers of each group incorporated in each of the second to fifth blocks 24-2 to 24-5. In these blocks 24-2 to 24-5, too, the coefficient set in one of the register of each group is selected by the selector associated with the register group, in accordance with a coefficient-selecting signal, and is then supplied to the multiplier associated with the register group.

In the meantime, the image (an image signal) input from the camera 20 is supplied to a synch separation circuit 51. The synch separation circuit 51 separates the horizontal sync signal from the image signal and inputs the horizontal sync signal to a frame memory 52 provided for use in selecting coefficients.

The frame memory 52 for use in selecting coefficients stores data items (hereinafter called "coefficient-selecting data items"), each representing one of the four registers of each coefficient register group of each of the five blocks. The frame memory 52 has storage size corresponding to one frame of the input image. The storage regions of the memory correspond to the positions of the pixels forming the input image. The coefficient-selecting data items stored in the frame memory 52 are associated with minimum units of input image, i.e., pixels. The coefficient-selecting data items have been stored into the memory 52 in minimum units of pixels, by means of a CPU 53.

The coefficient-selecting data items stored in the frame memory 52 are read from the start address for the first line of the frame memory, as the camera 20 is operated. Read addresses for the coefficient-selecting data items are sequentially changed in terms of line by the horizontal sync signals input from the synch separation circuit 51. The coefficient-selecting data items sequentially read from the frame memory 52 are supplied to the selectors of each block and used as coefficient-selecting signals.

In the spatial filter 22, the products (each being a pixel data item multiplied by a coefficient) obtained by the multipliers 31 to 35 of each of the blocks 24-1 to 24-5 are input to the adder 30. The adder 30 obtains the sum of these products.

The sum output from the adder 30, i.e., the output of the spatial filter 22, is input to a D/A converter 54. The D/A converter 54 converts the sum into an analog signal, which is output to a display 55.

The sync signal which the synch separation circuit 51 has separated from the image signal is input to a PLL 56, too. The PLL 56 controls the A/D converter 21, the spatial filter 22, the 4-line buffer 23 and the D/A converter 54 in accordance with the sync signal supplied from the synch separation circuit 51.

The sum obtained by the adder 30 may have a negative value, depending on the coefficients selected from the coefficient register group. In this embodiment, a carry is made in the adder 30 in order to make the sum positive in all cases. More precisely, several positive coefficients are stored in coefficient registers 56, a selector 57 selects one of these positive coefficients, and the selected positive coefficient is input to the adder 30 via a coefficient latch circuit 58.

The operation of this embodiment will now be explained.

First, the coefficients supplied from the CPU 53 are set via the data bus into the groups 36 to 40 of coefficient registers which are incorporated in the first to fifth blocks 24-1 to

24-5. For example, the coefficients "2", "1", "0" and "9" are set in the first to fourth registers of each group, respectively. In the case where coefficients of negative values need to be used, two sets of coefficients are set in the registers, and two's complements are displayed.

It will be described how to set a 5×5 coefficient pattern shown in FIG. 4A in the 5×5 coefficient latch circuit of the spatial filter 22, by using the four coefficients supplied from the CPU 53 and subsequently stored in the groups 36 to 40 of coefficient registers.

To set the coefficient pattern it is necessary to designate the number of each register by using such a coefficient-selecting data item as is illustrated in FIG. 4B.

Hence, the coefficient-selecting data items of the pattern shown in FIG. 4B, which designate the register numbers, are stored in that region of the frame memory 52 which corresponds to the pixel data to be processed by the spatial filter in which there has been set the coefficient pattern shown in FIG. 4A.

To reduce the number of bits of the frame memory for use in selecting coefficients, it suffices to use the same coefficient-selecting signal so that the same register number may be selected by each selector 45. In this case, however, a different coefficients is set in the first coefficient register of each group. Then, a 2-bit frame memory for use in selecting coefficients can serve to constitute a 4×4 spatial filter.

The input image taken by the camera 20 is input to the spatial filter 22 such that the pixel data items for the same column are input for every five lines. More specifically, the data item for a certain line is input to the first block 24-1, whereas the data item for the line immediately preceding that line is input to the second block 24-2, due to the delay operation of the 4-line buffer 23. Similarly, the data items for three lines, four lines and five lines ahead that line are input to the third, fourth and fifth blocks 24-3, 24-4 and 24-5, respectively.

To filter the pixel data item for a given line, the above-mentioned clock signal is input as a coefficient-changing signal to all coefficient latch circuits (45 to 50) of each block. The coefficients latched by the latch circuits are thereby reset. The coefficient-selecting data item for the region pertaining to the pixel data item is read out as a coefficient-selecting signal.

When the coefficient-selecting data shown in FIG. 4B is used, five coefficient-selecting signals designating the second register, the third register, the first register, the third register and the second register are input to the selectors 41 to 45, respectively, in the first block 24-1. Also in the second to fifth blocks 24-2 to 24-5, five coefficient-selecting signals designating the various registers are input to the selectors 41 to 45, respectively. Each selector selects a register in accordance with the coefficient-selecting signal, and the coefficient pattern of FIG. 4A is set in the spatial filter 22, with the coefficients supplied to the twenty-five (=5×5) multipliers incorporated in the filter 22.

This is how the 5×5 coefficients set in the spatial filter 22 are changed for a certain pixel data item. The pixel data item to be filtered is shifted in the direction of a line. Every time the pixel data item to be filtered is switched to another, the coefficient-selecting data item assigned to the new pixel data item on the frame memory is generated. The coefficient-selecting data item is used as a coefficient-selecting signal to change the coefficients of the spatial filter 22 as described above.

It will be described how the image processing apparatus of this embodiment perform a filtering process on the microphotographic image shown in FIG. 5A.

The various functions of the spatial filter is allocated to the regions of the microphotographic image which have different features. To be more specific, as shown in FIG. 5B, local averaging is performed on the upper-left region R1, independent-point detection on the lower-right region R2, and edge emphasizing on the intermediate region R3 between the regions R1 and R2. Furthermore, Laplacian filtering is conducted on the region R4 within the region R3.

Combinations (or patterns) of specific coefficients are stored as coefficient-selecting data items in the frame memory 52, at the addresses which correspond to the regions R1 to R4 of the input image. The coefficient-selecting data item, thus stored, serves to achieve the filtering process described above.

After the coefficient-selecting data items have been stored in the frame memory 52, in correspondence to the regions R1 to R4 of the microphotographic image, they are used in filtering the microphotographic image shown in FIG. 5A. That is, the coefficients set in the spatial filter 22 are changed in accordance with the coefficient-selecting data items allocated to the region which pertains to the pixel data time to be filtered. As a result, each region of the image is processed in a desired fashion.

In the present embodiment, the coefficient-selecting data item for each region (the smallest being one pixel) of the input image is stored in the frame memory 52 for use in selecting coefficients, various coefficients are stored in each register group, coefficient-selecting signals are supplied to all selectors in accordance with the coefficient-selecting data items assigned to the regions pertaining to the pixel data items to be processed, and desired coefficients are read from the register group and set. Hence, desired filtering processes can be performed on given regions of one frame, and the coefficients set in the spatial filter can be changed in minimum units of pixels. In addition, since the contents of any coefficient register are not rewritten, the apparatus can process the input image at speed high enough to be practically used in ordinary personal computers. Since the coefficients set in the spatial filter are changed for every pixel, the apparatus can filter and correlate the input image at the same time. In other words, since not only a filtering process but also a correlating process is effected, the apparatus functions as a filter optimal to a specific image.

As has been explained in conduction with the filtering process, the apparatus can accomplish interpolation, shading, DCT and pattern recognition, as well.

Unless an image need to be displaced in an enlarged or reduced form or in a changed resolution, it can be displayed without being subjected to processes such as image-size changing. Nonetheless, when the display used has a resolution different from the original image, the original image must be enlarged or reduced to have its resolution adjusted to that of the display.

Among the known ordinary methods of changing the size of an image are image-enlarging method and an image-reducing method. The image-enlarging method is to repeatedly use the same pixel data item or the same one-line image data item; how many times the data item is used depends upon the image-enlarging or -reducing ratio selected. The image-reducing method is to remove pixel data items or one-line image data items at a ratio which accords with the reduction ratio.

There is another known method of changing the ratio at which an image is to be enlarged or reduced. In the method, data not converted yet is interpolated, generating interpolated data, and the interpolated data is used as pixel data in enlarging or reducing the original image. Such a ratio-changing method is described in Jpn. Pat. Appln. KOKAI Publication No. 2-222992.

In the method of changing an image-enlarging or -reducing ratio, described in this publication, two pixels, two of which are located to the left and the right of the pixel to be interpolated, and the two others of which are located above and below the pixel to be interpolated, are subjected to linear approximation, and interpolation data is obtained and used to enlarge or reduce the original image. For instance, to enlarge the original image 8/5 times, each group of five pixel data items are converted to eight pixel data items, generating new interpolated data.

FIGS. 19A and 19B show how pixel data is interpolated in the horizontal direction, and FIG. 19C represents an operation model for calculating luminance. In FIG. 19C, "a", "b", "D1", "D2" and "F" indicate the distance ratio of an original pixel to an interpolated pixel, the distance ratio of another original pixel to the interpolated pixel, the luminance of the first original pixel, the luminance of the second original pixel and the luminance of the interpolated pixel, respectively.

As shown in FIG. 19, in the horizontal interpolation, the luminance of an interpolated pixel o be interpolated is calculated by performing the linear approximation represented by the following equation, on the left and right pixels:

$$F=(aD2+bD1)/(a+b)$$

By means of this luminance calculation, the pixel is interpolated from the adjacent pixels not converted yet, in accordance with an enlargement or reduction ratio.

The various methods of changing the ratio at which enlarge or reduce an image, described above, have the following problems. When identical data items are arranged in the same line to enlarge the image, or when some data items are removed to reduce the image, the image formed after the interpolation may be quite different in part from the original image if the image-enlarging or -reducing ratio or the reduction ratio is small. Consequently, the converted image turns out to be so unnatural that it can hardly be identified.

In the method in which linear approximation is carried out on the adjacent pixels (two pixels or four pixels), noise, if contained in the data representing the adjacent pixels, greatly influence the interpolation. Consequently, the resultant image has but poor quality.

These problems can be solved by the second embodiment and the third embodiment, which will be described below.

The second embodiment of the present invention will be described.

FIG. 6 is a function block diagram showing the image processing apparatus according to the second embodiment. In the image processing apparatus of this embodiment, a camera 110 generates image data, an A/D converter 111 converts the image data into digital signals, and the digital signals, i.e., the pixel signals for one frame are stored in a first image memory 112.

Data is read into and from the first image memory 112 under the control of a first memory controller 114 which receives commands from a CPU 113. The pixel signals read form the first image memory 112 are input to a 4×4 spatial filter 115.

Figure 7:
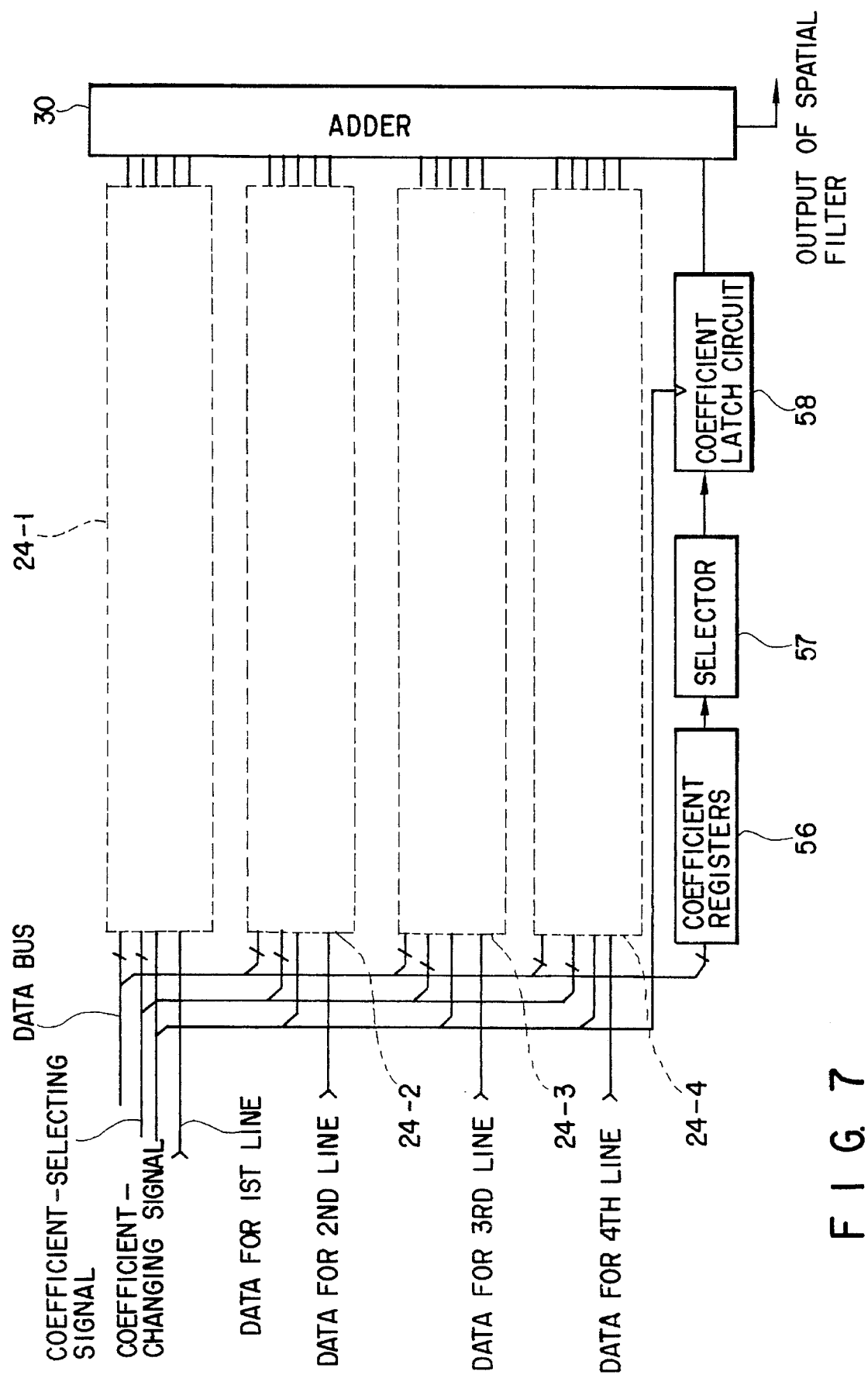
FIG. 7 is a schematic view of the spatial filter incorporated in the image processing apparatus which is the second embodiment.
Figure 8:
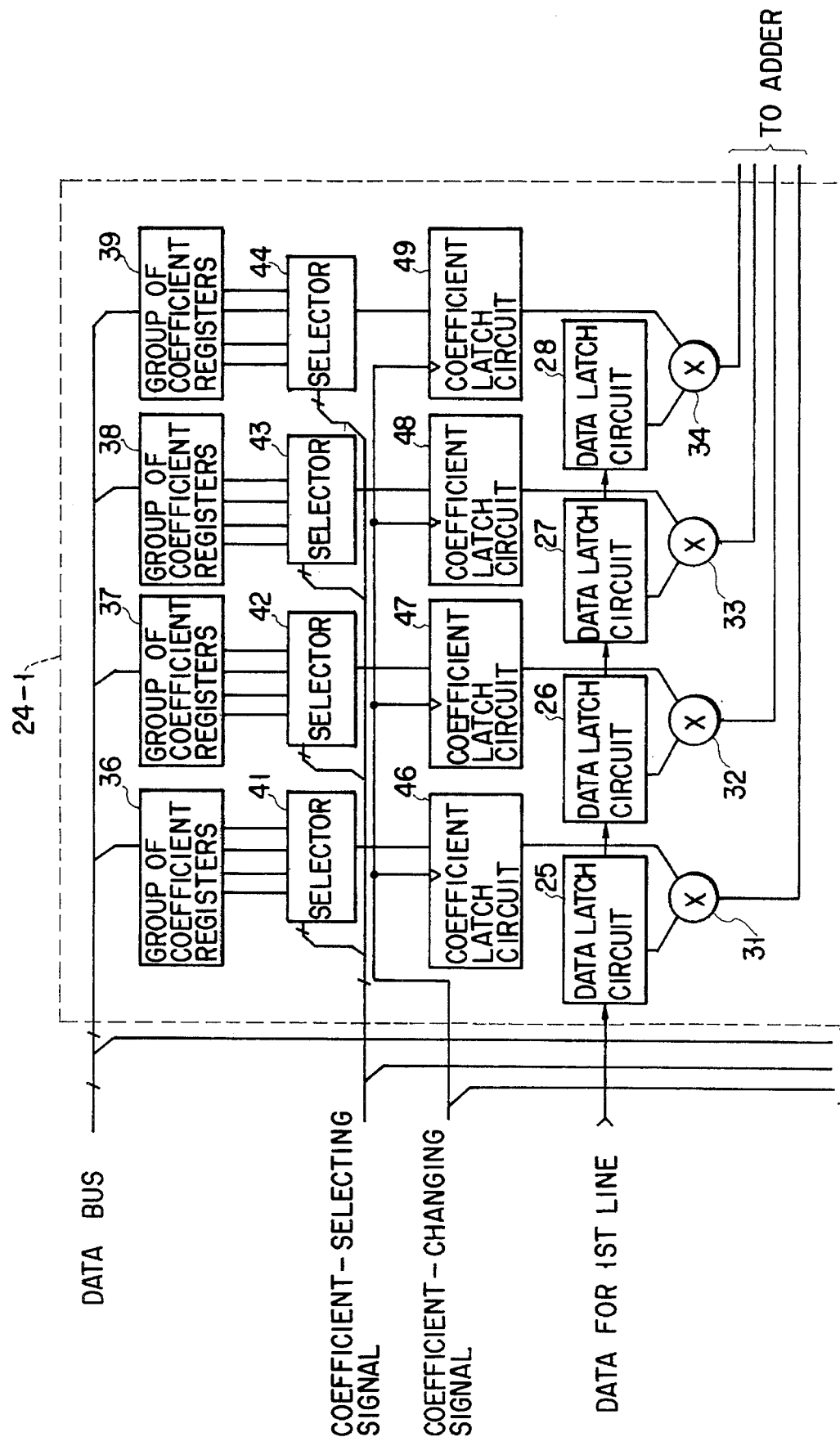
FIG. 8 is a diagram showing one of the blocks of the spatial filter incorporated in the image processing apparatus which is the second embodiment.

FIGS. 7 and 8 show the structure of the spatial filter 115. The spatial filter 115 is identical in basic structure to the 5×5 spatial filter described above. It differs in size only and is similar in structure to the 5×5 spatial filter. Therefore, the components identical to those of the 5×5 spatial filter are designated at the same reference numerals and will not be described.

The spatial filter 115 is divided into four blocks 24-1 to 24-4. The first to fourth blocks 24-1 to 24-4 have the same internal structure. FIG. 8 shows the internal structure of the first block 24-1.

The CPU 113 supplies the first memory controller 114 with the data representing the frequency of a read clock signal which the controller 114 uses to read pixel signals from the first image memory 112. The data is supplied also to a frame memory 124 for use in selecting a coefficient. The frame memory 124 for use in selecting coefficients stores coefficient-selecting data items, each representing one of the four registers of each coefficient register group of each of the four blocks. The frame memory 134 has storage capacity corresponding to one frame of the input image. The coefficient-selecting data items stored in the frame memory 124 are associated with minimum units of input image, i.e., pixels. The coefficient-selecting data items have been allocated to minimum units of pixels, by means of the CPU 113.

The coefficient-selecting data items stored in the frame memory 124 are read from the addresses which correspond to the read addresses of the first image memory 112. The coefficient-selecting data items sequentially read from the frame memory 124 are supplied to the selectors of each block and used as coefficient-selecting signals.

In the spatial filter 115, the products (each being a pixel data item multiplied by a coefficient) obtained by the multipliers 31 to 34 of each of the blocks 24-1 to 24-4 are input to the adder 30. The adder 30 obtains the sum of these products. The spatial filter 115 operates in accordance with the clock signal supplied from a clock signal generating section 125.

The sum output from the adder 30 is input to a second image memory 127 under the control of a second memory controller 126 which has received instructions from the CPU 113. The second image memory 127 is connected by a D/A converter 128 to a display 129. The display 129 displays the image which has been obtained through a process, such as interpolation, performed by the spatial filter 115.

How to set coefficients in the spatial filter 115 will now be explained. Generally, when an original image is either enlarged or reduced by a factor of m/n, the distance ratios of adjacent two pixels, i.e., the left pixel and the right pixel, of the original image is one-dimensionally repeated m times, with respect to the i-th pixel of the enlarged or reduced image. Namely:

$$(n \cdot i + \alpha)\% \ m:m-(n \cdot i + \alpha)\% \ m$$

where % is the remainder, and $\alpha$ is a real constant (i.e., the offset of the entire frame), where $0<\alpha<m$. Here it is assumed that m and n are prime to each other.

The two adjacent pixels of the original image are the $(n \cdot i + \alpha)/m$-th pixel and the $(n \cdot i + \alpha)/(m+1)$-th pixel, where $(n \cdot i + \alpha)/m$ and $(n \cdot i + \alpha)/(m+1)$ are integers, each obtained by discarding a fraction.

These are expanded to two-dimensional scale, thereby obtaining the luminance of an interpolated pixel from the adjacent four pixels.

When the adjacent four pixels have luminance A, B, C and D as shown in the model illustrated in FIG. 9, the luminance X of the interpolated pixel is given as follows:

$$X = \{A(b^2+d^2)^{1/2} + B(a^2+d^2)^{1/2} +$$
$$C(b^2+c^2)^{1/2} + D(a^2+c^2)^{1/2}\} \div$$
$$\{(a^2+b^2)^{1/2} + (b^2+c^2)^{1/2} +$$
$$(a^2+c^2)^{1/2} + (b^2+d^2)^{1/2}\}$$

where $a = (n \cdot i + \alpha) \% m$ $b = m - a$ $c = (n \cdot j + a) \% m$ $d = m - c$ In the above, i means the i-th column, and j means the j-th row. The coefficients used in the spatial filter are:

$$K1 = (b^2+d^2)^{1/2}/\{(a^2+b^2)^{1/2} +$$
$$(b^2+c^2)^{1/2} + (a^2+c^2)^{1/2} +$$
$$(b^2+d^2)^{1/2}\}$$

$$K2 = (a^2+d^2)^{1/2}/\{(a^2+b^2)^{1/2} +$$
$$(b^2+c^2)^{1/2} + (a^2+c^2)^{1/2} +$$
$$(b^2+d^2)^{1/2}\}$$

$$K3 = (b^2+c^2)^{1/2}/\{(a^2+b^2)^{1/2} +$$
$$(b^2+c^2)^{1/2} + (a^2+c^2)^{1/2}$$

$$K4 = (a^2+c^2)^{1/2}/\{(a^2+b^2)^{1/2} +$$
$$(b^2+c^2)^{1/2} + (a^2+c^2)^{1/2} +$$
$$(b^2+d^2)^{1/2}\}$$

The coefficients are set in the spatial filter, in accordance with these equations. A specific example will be described.

To enlarge the original image 1 to 2 times, for example 1.6 times (i.e., 8/5 times) (namely, to convert 640 pixels to 1024 pixels), the data set in the spatial filter is one interpolated from pixel data which is principally identical.

Figures 9, 10A, 10B, 10C, 10D:
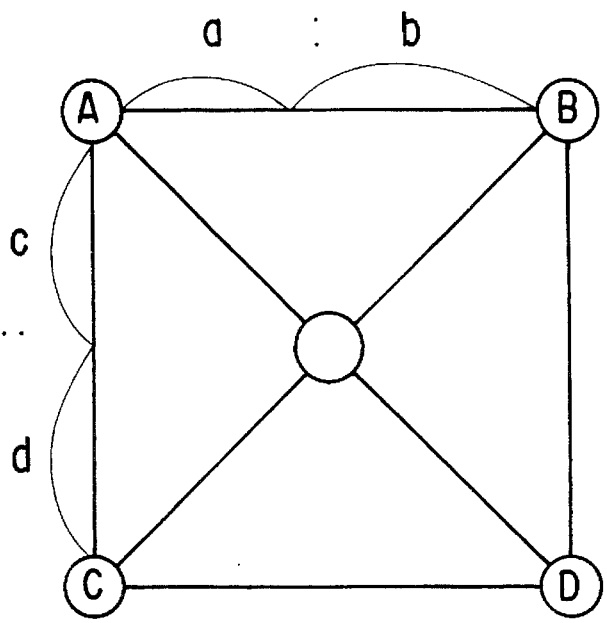
FIG. 9 is a diagram for explaining the principle of determining coefficients.
FIGS. 10A to 10D are diagrams showing various coefficient patterns.

The coefficients to be set in the 4×4 spatial filter 115 forms a matrix of the pattern shown in FIG. 10A or a matrix of the pattern shown in FIG. 10B. The pattern of FIG. 10B is used in order to calculate that part of the image which has been interpolated with identical pixel data items which represent the integral part of the (n·i+α)/m-th pixel and the integral part of the (n(i+1)+α)/m-th pixel.

A value to be set in either coefficient matrix is K calculated by substituting 8 and 5 for m and n in the equation (3), respectively. Coefficients Ks (8×8) are obtained, for 8 columns and 8 rows, and set in the memory 124 for use in selecting coefficients, so that they may be read from the groups of registers in accordance with specific rules.

To enlarge the original image 2 to 3 times, the coefficients required form a matrix of the pattern shown in FIG. 10C or a matrix of the pattern shown in FIG. 10D. When the original image is to be enlarged 3 or more times, a 4×4 filter cannot serve at all. A spatial filter of an (integral ratio+1)× (integral ratio+1) matrix needs to be used instead.

To reduce the original image, for example, to enlarge it 0.625 times (i.e., 5/8 times) (namely, to convert 1024 pixels to 640 pixels), some of the pixel signals calculated by the spatial filter are removed in accordance with specific rules. In this case, the coefficients to be set in the 4×4 spatial filter 115 forms a matrix of the pattern shown in FIG. 10A. The values for the coefficients K1 to K4 are those obtained by substituting 5 and 8 for m an n in the equation (3), respectively. Coefficients Ks (5×5) are obtained, for 5 columns and 5 rows, and those coefficients corresponding to the pixels not to be removed, i.e., every (n·i+α)/m-th pixel, are set in the coefficient memory.

The operation of the present embodiment, which has the structure described above, will be described.

First, it will be explained how to change the coefficients set in the spatial filter 115. In the spatial filter 115, a clock signal is input as a coefficient-changing signal to all coefficient latch circuits (45 to 50) of each block in order to filter the pixel data item for a given line. The coefficients latched by the latch circuits are thereby reset. In the meantime, the coefficient-selecting data item for the region pertaining to the pixel data item is read out as a coefficient-selecting signal. As a result, the 16 coefficients (i.e., 4×4 coefficients) set in the spatial filter 115 for a certain pixel image data item are changed. The pixel number to be processed is shifted in the direction of a line in synchronization with the fundamental clock signal. Every time the pixel data item to be filtered is switched to another, there is generated a coefficient-selecting data item assigned to that region on the frame memory in which the pixel data item to be processed. The coefficient-selecting data item is used as a coefficient-selecting signal, changing the coefficients of the spatial filter 115.

It will now be explained how to enlarge an image.

The data representing the image photographed by the camera 110 is converted into digital data by the A/D converter 111. The digital image data representing one frame is supplied to the first image memory 112. Coefficient-selecting data items are stored into the frame memory 124 for use in selecting coefficients, associated with the pixel data items stored in the first image memory 112. The coefficient-selecting data items determined by the method described above are set for the pixels of a region which is to be enlarged.

Next, the first memory controller 114 selects the pixel signals pertaining to the region which is to be enlarged. The pixel signals selected are supplied to the spatial filter 115. The first memory controller 114 selects the region to be enlarged which has been designated by the CPU 113, line by line, and repeatedly reads the line to be interpolated in accordance with the ratio at which the image is to be enlarged in vertical direction. The pixel signals supplied to the spatial filter 115 forms a matrix consisting of the same number of columns as the region to be enlarged form a matrix each row of which consists of as many columns as those of the region which is to be enlarged, and as many rows as those of the region which has been enlarged.

To enable the spatial filter 115 to process the pixel signals representing the region to be enlarged, the clock signal generating section 125 supplies with filter 115 with an operating clock signal having a frequency increased by the ratio at which to enlarge the region in the horizontal direction.

As a result, the first memory controller 114 expands the pixel signals pertaining to the region to be enlarged are expanded in the vertical direction. The spatial filter 115, which is driven by the operating clock signal having a frequency increased by the ratio at which to enlarge the region in the horizontal direction, carries out the 4×4 interpolation by using the coefficients. The results of the interpolation are stored into the second image memory 127 under the control of the second memory controller 126. The image data stored in the second image memory 127 is supplied to the display 129, which displays an enlarged image.

In order to reduce the original image, coefficient-selecting data items are stored into the frame memory 124 for use in selecting coefficients, associated with the pixel data items stored in the first image memory 112. The coefficient-selecting data items determined by the method described above are set for the pixels of a region which is to be reduced.

The pixel signals are read from the first image memory 112 in synchronization with the fundamental clock signal under the control of the first memory controller 114. The spatial filter 115 is driven in synchronization with the fundamental clock signal, too. The coefficients set in the spatial filter 115 are rewritten to the above-mentioned coefficients for reducing the original image, so that the pixel signal representing the region to be reduced may be processed. Using the new coefficients, the spatial filter 115 performs 4×4 interpolation.

Some of the pixel signals processed by the spatial filter 115 are removed in accordance with the ratio at which to reduce the region, under the control of the second memory controller 126. The remaining pixel signals are stored into the second image memory 127. As a result, the image data representing the image reduced at that ratio has been stored into the second image memory 127.

In the present embodiment, the coefficients set in the spatial filter 115 are changed in units of pixels, the pixel signals selected and read from the first image memory 112 under the control of the first memory controller 114 are interpolated by using the operating clock signal supplied from the clock signal generating section 125. Therefore, image-processing operations such as interpolation, can be effected at high speed. The original image can easily be enlarged at any desired ratio, and an image such as a moving picture can be displayed on a high-resolution display which has a large number of pixels.

Furthermore, since some of the pixel signals processed by the spatial filter 115 are removed in accordance with the ratio at which to reduce the region, under the control of the second memory controller 126, and the remaining pixel signals are stored into the second image memory 127, a high-resolution image can be displayed on a display having a small number of pixels.

The third embodiment of the present invention will now be described.

Figure 11:
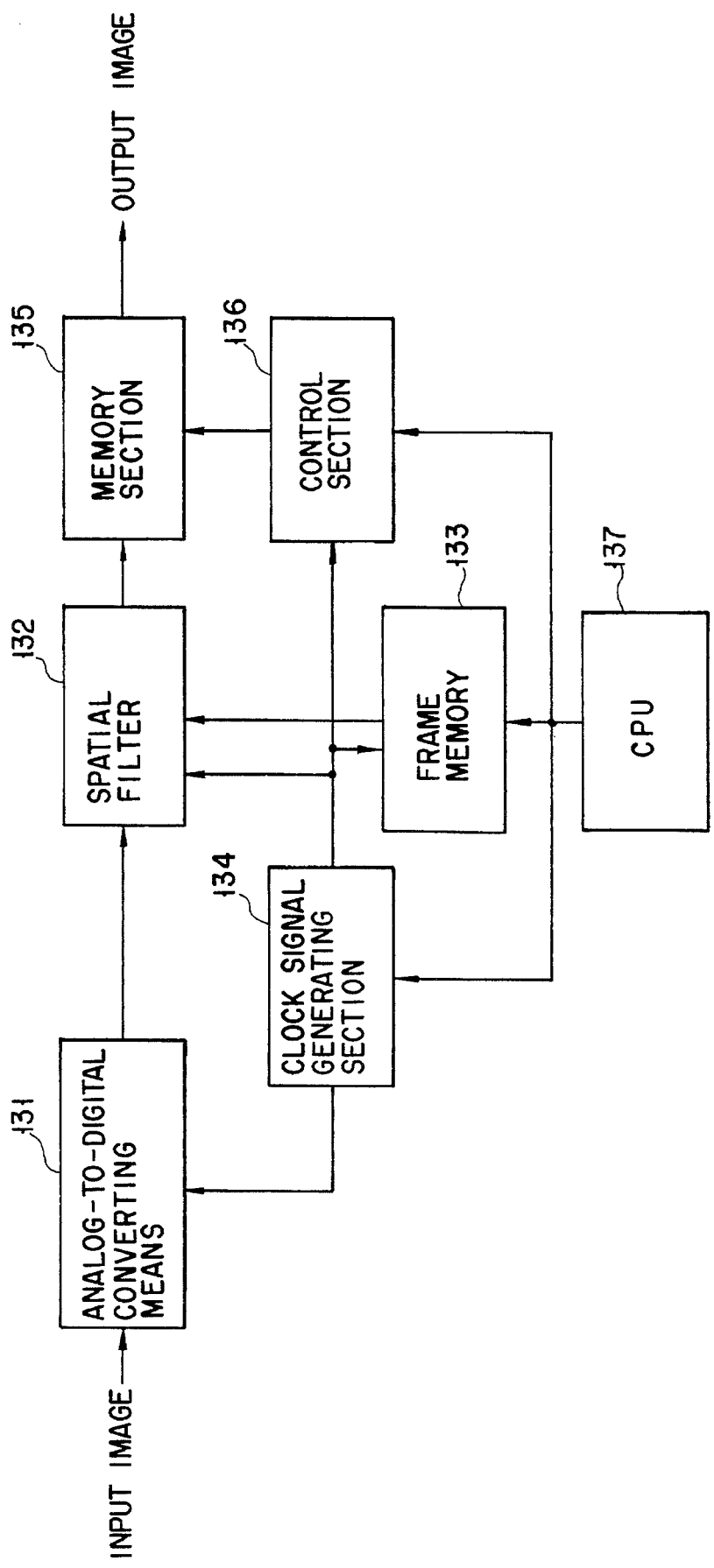
FIG. 11 is a schematic view of an image processing apparatus which is a third embodiment of the present invention.

FIG. 11 is a schematic view of an image processing apparatus which is the third embodiment. This image processing apparatus comprises an analog-to-digital converting means 131, a spatial filter 132, a frame memory 133 for use in selecting coefficients, a clock signal generating section 134, a memory section 135, and a control section 136. The means 131 converts image signals supplied from an image input device such as a television camera, into digital image signals. The spatial filter 132 has a memory section for storing the digital image signals in units of lines and can change i×j operation coefficients in units of pixels. The frame memory 133 is provided to store the operation coefficients output from the spatial filter 132. The clock signal generating section 134 changes the operating clock signal in accordance with an image-enlarging or -reducing ratio. The memory section 135 is provided for store the data representing an image either enlarged or reduced. The control section 136 controls data-writing into the memory section 135 and data-reading from the memory section 135. The data to be stored into the frame memory 133, the timing of operating the clock signal generating section 134 and the timing of operating the control section 136 are controlled by a CPU 137.

FIG. 12 illustrates the image processing apparatus in greater detail. The apparatus, which is one embodiment of the invention, will be described with reference to FIG. 12. The input image data from a camera 141 is input to an A/D converter 142 and converted thereby into digital signals. The digital image signals are input to a filter unit 143.

The spatial filter unit 143 used in this embodiment has a space region of a 4×4 pixel matrix size. It is therefore necessary to supply four consecutive lines of data to effect an operation. To this end, the unit 143 has line memories 144-1 to 144-3 for storing four lines of image data supplied from the A/D converter 142. Using these three line memories 144-1 to 144-3, each having a storage capacity of one-line data, four consecutive lines of data is supplied to a spatial filtering section 145.

The spatial filtering section 145 is designed to perform operations to enlarge or reduce the image data. The section 145 is identical in structure to the 4×4 spatial filter shown in FIGS. 7 and 8. Hence, the section 145 will be described, using the same reference numerals designating the components of the spatial filter shown in FIGS. 7 and 8.

The present embodiment can enlarge or reduce an image entirely. Also can it enlarge or reduce any desired region of the image since it is possible to change the coefficients set in the spatial filter 143 for every pixel. Coefficient-selecting signals are generally set in a predetermined pattern which allows for various image processing on individual pixels. In this embodiment, the coefficient pattern can be switched to a plurality of patterns so that a plurality of pixels may be interpolated for the identical original pixels in order to enlarge the original image. The coefficient-selecting data items are set so that a plurality of coefficient patterns may be set at predetermined timing (defined by a high-speed clock signal) for the identical pixels in the region which is to be enlarged.

The coefficients in the registers which selectors 41 to 44 have selected in accordance with the coefficient-selecting data items supplied from a coefficient-selecting signal memory 153 are supplied to multipliers 31 to 34 through coefficient latch circuits 46 to 49 which are provided for the selectors 41 to 44, respectively.

The spatial filter unit 143 is driven by the clock signal output by an operating clock signal generating section 155 in accordance with an image-enlarging or -reducing ratio. The data processed is stored into an image memory 157 under the control of a memory control circuit 156.

The image data stored in the image memory 157 is read under the control of the memory control circuit 156. It is then supplied via a D/A converter 158 to a display 159, which displays an enlarged or reduced image.

The method of enlarging and reducing an image in the present embodiment will be explained below.

First, the coefficient patterns to be set in the 4×4 multipliers of the spatial filter 143 are formed in accordance with the image-enlarging or -reducing ratio. Since the image-enlarging or -reducing ratio determines the position of a pixel to be interpolated, the correlation among adjacent original pixels, which is required to interpolate that pixel, is calculated from the distance of the pixel and each original pixel. The correlation, thus calculated, is set as a coefficient.

For example, a coefficient pattern, which is required in interpolating a pixel X0 from 4×4 original pixels X1 to X16 as shown in FIG. 13, is obtained in the following way.

To enlarge or reduce the original image m/n times, the distance ratios a, b, c and d of four pixels adjacent to the pixel X0 are repeated m times. If the pixel X0 assumes a position (i, j), then the distance ratios a, b, c and d will be obtained, as follows, based on the image-enlarging or -reducing ratio:

$$a:b = ni\%m : m-a$$

$$c:d = nj\%m : n-c$$

where % is the remainder, and m and n are elemental to each other. The distance Ln between an interpolated pixel X0 and any original pixel Xn required for interpolation can be calculated from the distances among the pixels arranged in a matrix:

$$L1 = (a^2 + c^2)^{1/2},$$

$$L2 = (b^2 + c^2)^{1/2},$$

$$L3 = (a^2 + d^2)^{1/2},$$

$$L4 = (b^2 + d^2)^{1/2},$$

$$L5 = (c^2 + (2a+b)^2)^{1/2},$$

and so forth.

The correlation of each original pixel with the interpolated pixel is:

$$1/L1 : 1/L2 \ldots : 1/Ln$$

Therefore, the interpolated pixel has a luminance (X0) which is given as follows:

$$X0 = \Sigma(Xn/Ln)/\Sigma(1/Ln)$$

Hence, it suffices to set the reciprocal of the distance between the interpolated pixel and each adjacent pixel as the coefficient Kn for the interpolated pixel X0.

Figures 14, 15:
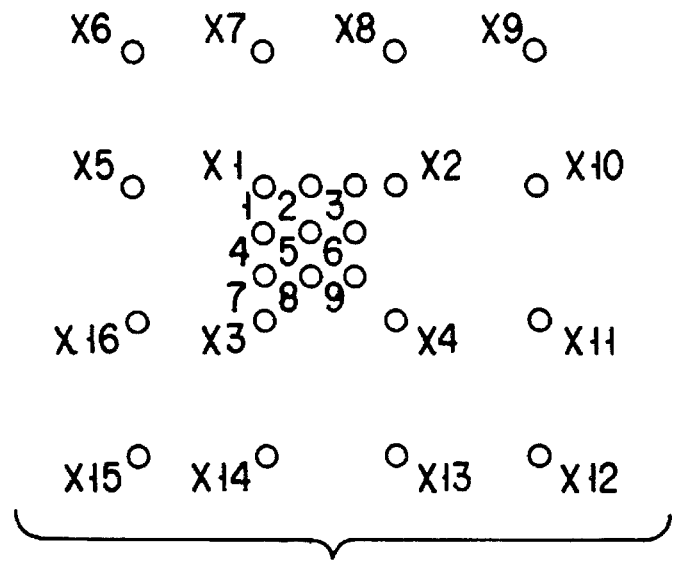
FIG. 14 is a diagram explaining how to generate nine pixels by interpolating a 4×4 original pixel matrix.
FIG. 15 is a diagram showing the operation coefficients of a 4×4 pixel matrix.

With reference to FIGS. 14 and 15, it will be explained how to enlarge a designated region of an image three times. To interpolate nine pixels for original pixels X1 to X16 as shown in FIG. 14, nine coefficient patterns of the size shown in FIG. 15 are required, each for one interpolated pixel. More precisely, the nine coefficient patterns shown in FIGS. 16A to 16I need to be used. The coefficient-selecting signal memory 153 stores coefficient-selecting data items for causing selectors (41 to 44) to select and supply the coefficient patterns of FIGS. 16A to 16I from coefficient register groups (36 to 39). The same operation is effected in the other three blocks of the spatial filter 143.

When a pixel to be interpolated is set in the 4×4 multipliers incorporated in the spatial filter 143, the operating clock signal generating section 155 generates an operating clock signal in accordance with the instructions given by a CPU 154. The spatial filter 143 performs interpolation nine times, driven by the operating clock signal supplied from the operating clock signal generating section 155, every time one pixel data item is input. Meanwhile, the coefficient-selecting signal memory 153 is driven nine times by the operating clock signal from the section 155, sequentially supplying the coefficient patterns of FIGS. 16A to 16I to the selectors (41 to 44). That is, the spatial filter 143 repeats interpolation nine times for each original pixel, and the coefficient patterns A to I are switched to achieve each interpolation.

The interpolation is effected on each pixel input from the television camera 141, at high speed by using the operating clock signal from the operating clock signal generating section 155, whose frequency is nine times as high, thereby obtaining data representing an enlarged image. If no interpolation needs to be carried out, the original pixels are output.

The coefficient patterns are repeated at prescribed time intervals. Finally, the designated region of the image is enlarged, three times in the vertical direction and three times in the horizontal direction. Pixel data items nine times as many as those representing the designated region of the original image are thereby generated and stored into the image memory 157.

In the case where the image-enlarging ratio is not an integral one, too, the coefficient patterns are switched in accordance with the ratio and set in the spatial filter 143. If the image-enlarging ratio is, for example, 8/5, the operating clock signal changed to one 64/25 times the original signal, and the 5×5 pixel data items representing the original image are changed to 8×8 pixel data items, thereby enlarging the original image. In other words, the pixel image data items increase from 25 (5×5) items to 64 (8×8) items.

To reduce the original image, some of the pixel signals are removed in accordance with the image-reducing ratio under the control of the second memory controller 156. The spatial filter unit 143 is driven by an operating clock signal having the same frequency as the data-reading frequency in some cases, and by an operating clock signal having a frequency lower than the data-reading frequency in other cases.

When the unit 143 is driven an operating clock signal having the same frequency as the data-reading frequency, the interpolated image data is output, with the number of pixels remaining unchanged. Only the interpolated pixels required in accordance with the image-reducing ratio are stored into the image memory 157 under the control of the memory control circuit 156. The data representing the reduced image is thereby stored into the image memory 157. The image data stored in the image memory 157 is read under the control of the memory control circuit 157 and supplied to the display 159, whereby the display 159 displays the reduced image. Alternatively, the interpolated data is stored into the image memory 157, without removing any pixel data items from the interpolated data output by the spatial filter 143, and only the pixels required in accordance with the image-reducing ratio are read from under the memory control circuit 156 and displayed. By this method, too, the reduced image can be displayed.

To lower the frequency of the operating clock signal supplied to the spatial filter 143 below the frequency of reading the input image, interpolation is performed on only those of the pixels forming each line which are required to display a reduced image, thereby reducing the number of times the interpolation is repeated. The interpolated lines required in accordance with the image-reducing ratio are stored under the control of the memory control circuit 156. As a result of this, the image data, from which some pixel data items have been removed in the vertical and horizontal directions, is stored into the image memory 157. Alternatively, the interpolated data is stored into the image memory 157, without removing any pixel data items, and the interpolated lines required in accordance with the image-reducing ratio ratio are selected and displayed.

How to reduce the original image three times will be explained, with reference to FIG. 17. In FIG. 17, white dots indicate the original pixels, and black dots interpolated pixels.

If the operating clock signal for the spatial filter 143 has the same frequency as the operating clock signal for the input data, it suffices to store every third pixel and every third line of the image data after the interpolation. If the operating clock signal for the spatial filter 143 has a frequency which is one-third the frequency of the operating clock signal for the input data, interpolation is performed once on every three input pixels. Therefore, interpolated pixel data items are output in numbers one-third the input pixel data items, for each line. Further, one out of every three lines is removed under the control of the memory control circuit 156. As a result, the pixel data items nine times less than the original pixel data items are stored into the memory.

The coefficients for the interpolated pixels are determined by the method described above. FIG. 18 shows an example of a coefficient pattern used to reduce the image in the method described above.

To reduce the original image, for example, to enlarge it 5/8 times, interpolation is carried out 5×5 times, each time on 8×8 input pixels. It is possible with the present invention to enlarge or reduce the original image, while maintaining correlation between a interpolated pixel and each adjacent to the original pixel. To this end, it suffices to increase pixels be processed and, if necessary, to replace the spatial filter with another which has a different size.

In the present embodiment, the spatial filter performs interpolation on adjacent pixels as well. The embodiment can therefore prevent unnatural conversion of an image, which may otherwise occur in conversion process, and can solve a problem accompanying unnatural conversion of an image, such as deterioration of image quality. The apparatus can provide a natural image correlated with the surrounding pixels.

Two types of systems for achieving spatial filtering on color signals are available, which are illustrated in FIGS. 26A and 26B.

In the system of FIG. 26A, a color image output from a microscope functioning as an image input device is converted an R signal, a G signal and a B signal by an A/D converter. The R, G and B signals are filtered by three spatial filters, respectively. The color signals output from the spatial filters are combined into one signal, which is converted into a color image signal by an D/A converter. The color image signal is supplied to a display, which display a color image.

The system shown in FIG. 26B is designed to process an NTSC signal consisting of a luminance signal Y and color-difference signals I (=R−Y) and Q (=B−Y). In this system, only the luminance signal Y is filtered by a spatial filter. The luminance signal Y output from the spatial filter is combined with the color-difference signals I and Q, forming a composite signal. The composite signal is converted into a color image signal by a D/A converter. The color image signal is supplied to a display, which display a color image.

In the system of FIG. 26A, the spatial filtering is effected on color changes in the R, G and B signals, and the image displayed based on the processed signals differs in color from the original image. Moreover, the same filtering process must be repeated three times, inevitably increasing the number of data-processing steps. In the system of FIG. 26B, that part of the image displayed, which has been processed while the NTSC signal is converted into R, G and B signals, differs in color from the corresponding part of the original image. This is because the color-difference signals are used to convert the NTSC signal into R, G and B signals.

The reason why these problems arise will be explained, taking for example the case where the luminance signal is filtered and then applied to the original image signals (Y, R−Y, B−Y).

The luminance signal Y is filtered, forming a signal Y' which is Y+ΔY. Then, the luminance signal Y' and the color-difference signals I and Q are processed to reproduce R, G and B signals, which are:

$$R = (R-Y) + Y'$$
$$= R + \Delta Y$$

$$G = -0.51(R-Y) - 0.19(B-Y) + Y'$$
$$= (G-Y) + Y'$$
$$= G + \Delta Y$$

$$B = (B-Y) + Y'$$
$$= B + \Delta Y$$

Namely, the R, G and B signals are changed by ΔY, and the three color attributes of the original image, i.e., the hue, chroma and brightness thereof, inevitably change after the filtering. Not only the luminance signal which is the sole object of filtering and which represents the brightness of color, but also the color data of the original image has been changed.

In the system shown in FIG. 26B, no process is effected on the input image even if the hue of the input image changes, provided that the luminance remains unchanged.

In most cases, a microphotographic image consists of regions of different colors since the sample microphotographed is colored as such. If all colors such an image has are processed in the same way, information can be acquired but from only one specific component of each color. In other words, no information can be acquired from the other components of the color.

The fourth embodiment of the present invention can solve the problems described above, as will be described later.

FIG. 20 is an overall view of the image processing apparatus which is the fourth embodiment.

The image processing apparatus according to the fourth embodiment has a camera 211 which is used as image input means for taking a color image. The analog color image signal output by the camera 211 is converted by an A/D converter 212 into an R signal, a G signal and a B signal which are digital signals and which represent the input image. The R, G and B signals are input to an Lab converting section 213. The section 213 converts the R, G and B signals to three parameters of CIE1976 L*a*b* color space, i.e., brightness L*, chroma S and hue parameter tanθ (=b*/a*). The brightness L* and the chroma S, both output from the Lab converting section 213 are input to a spatial filter unit 215 via a delay section 214, whereas the hue parameter tanθ is input to a comparator section 216. As will be explained later, the hue is represented as tanθ=b*/a* on the contour line of hue and contour line of chroma of Munsell color system.

Set in the comparator section 216 are different reference values 1 to n and coefficient-selecting data items corresponding to the reference values. The comparator section 216 outputs a coefficient-selecting signal to the spatial filter unit 215. The coefficient-selecting signal corresponds to the reference value which is most similar to the hue parameter tanθ supplied from the Lab converting section 213.

The spatial filter unit 215 comprises a register section 64, a selector section 65 and a spatial filtering section 219. The register section 64 stores filtering coefficients. The selector section 65 is designed to select and reads a filtering coefficient pattern from the register section 64 in accordance with the coefficient-selecting signal. The filtering coefficient pattern selected by the section 65 is set in the spatial filtering section 219. The filtering coefficients stored in the register section 64 can be rewritten.

The delay section 214 delays the signals from the Lab converting section 213 and outputs the signals corresponding to i consecutive lines of the original image, first the pixels forming the first column, then the pixels forming the second column, and so forth. The signals representing the pixels of each column are supplied to the spatial filtering section 219 at the timing of setting the filtering coefficients in the spatial filtering section 219.

The output of the spatial filtering section 219 is converted into an R signal, a G signal and a B signal by an RGB converting section 221. The R, G and B signals are supplied to a D/A converter 222. The converter 222 converts the input signals into analog signals, which are supplied to a display 223.

In the meantime, the image signal output by the camera 211 is input to a sync signal separating circuit 224. The circuit 224 separate a sync signal from the image signal and supplies the sync signal to a PLL 225. Upon receipt of the sync signal the PLL 225 generates a timing control signal. The timing control signal is supplied to the A/D converter 212, the Lab converting section 213, the delay section 214, the spatial filtering section 219, the RGB converting section 221 and the D/A converter 222, whereby these components operate synchronously.

Figure 21:
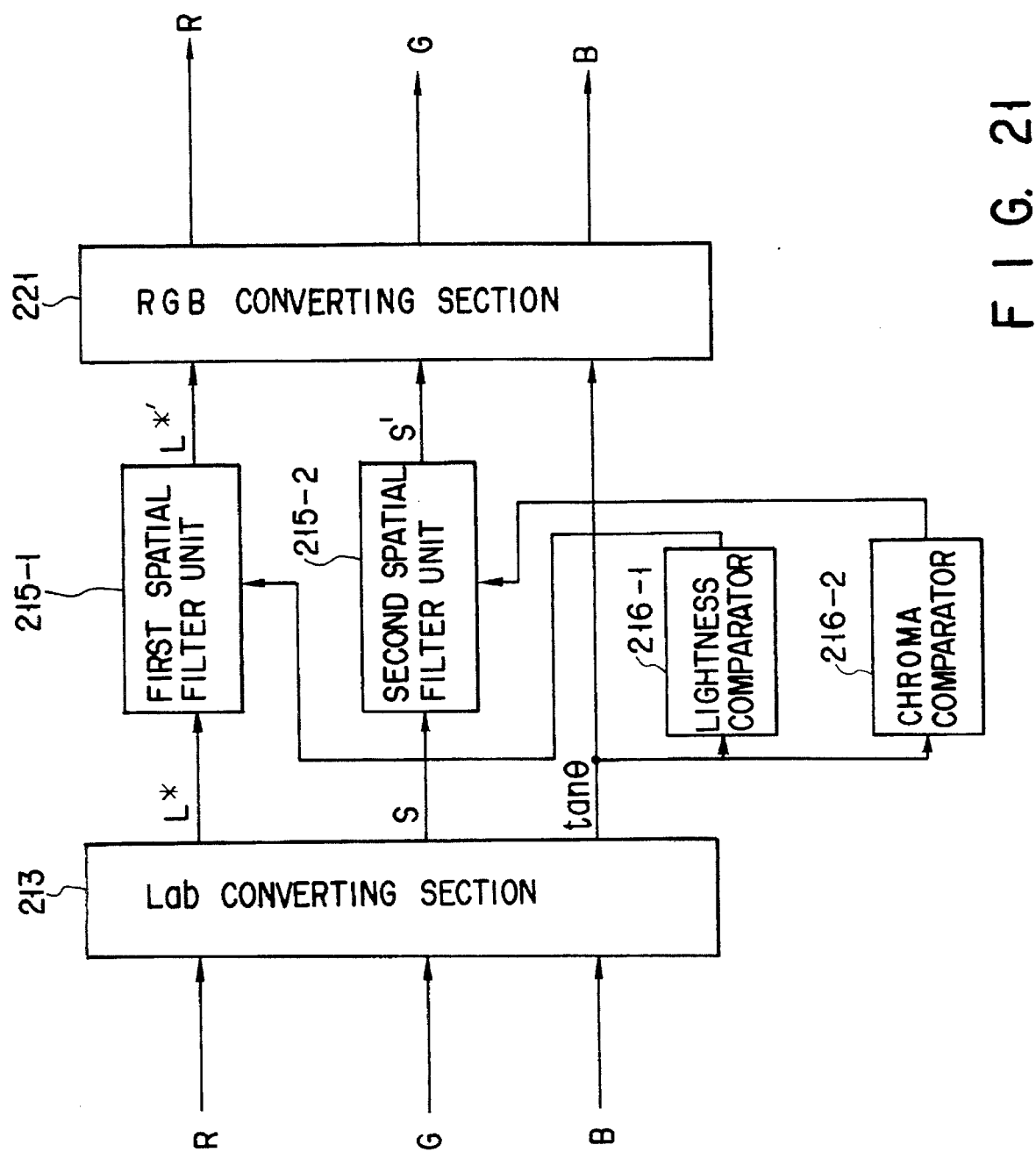
FIG. 21 is a diagram showing the Lab conversion section, spatial filter unit, comparator section and RGB conversion section of the image processing apparatus which is the fourth embodiment.

As shown in FIG. 21, the spatial filtering section 215 comprises a first spatial filter unit 215-1 and a second spatial filter unit 215-2. The units 215-1 and 215-2 are provided for filtering the brightness L* and the chroma S, respectively. The comparator section 216 comprises a brightness comparator 216-1 and a chroma comparator 216-2. The brightness comparator 216-1 supplies a coefficient-selecting signal to the first spatial filter unit 215-1, whereas the chroma comparator 216-2 supplies a coefficient-selecting signal to the second spatial filter unit 215-2. The delay section 214, not shown in FIG. 21, supplies the delayed signals to the first spatial filter unit 215-1 and the second spatial filter unit 215-2.

The first spatial filter unit 215-1 and the second spatial filter unit 215-2 have the same structure. Hereinafter, they will be therefore collectively called "spatial filter unit 215."

Figure 23:
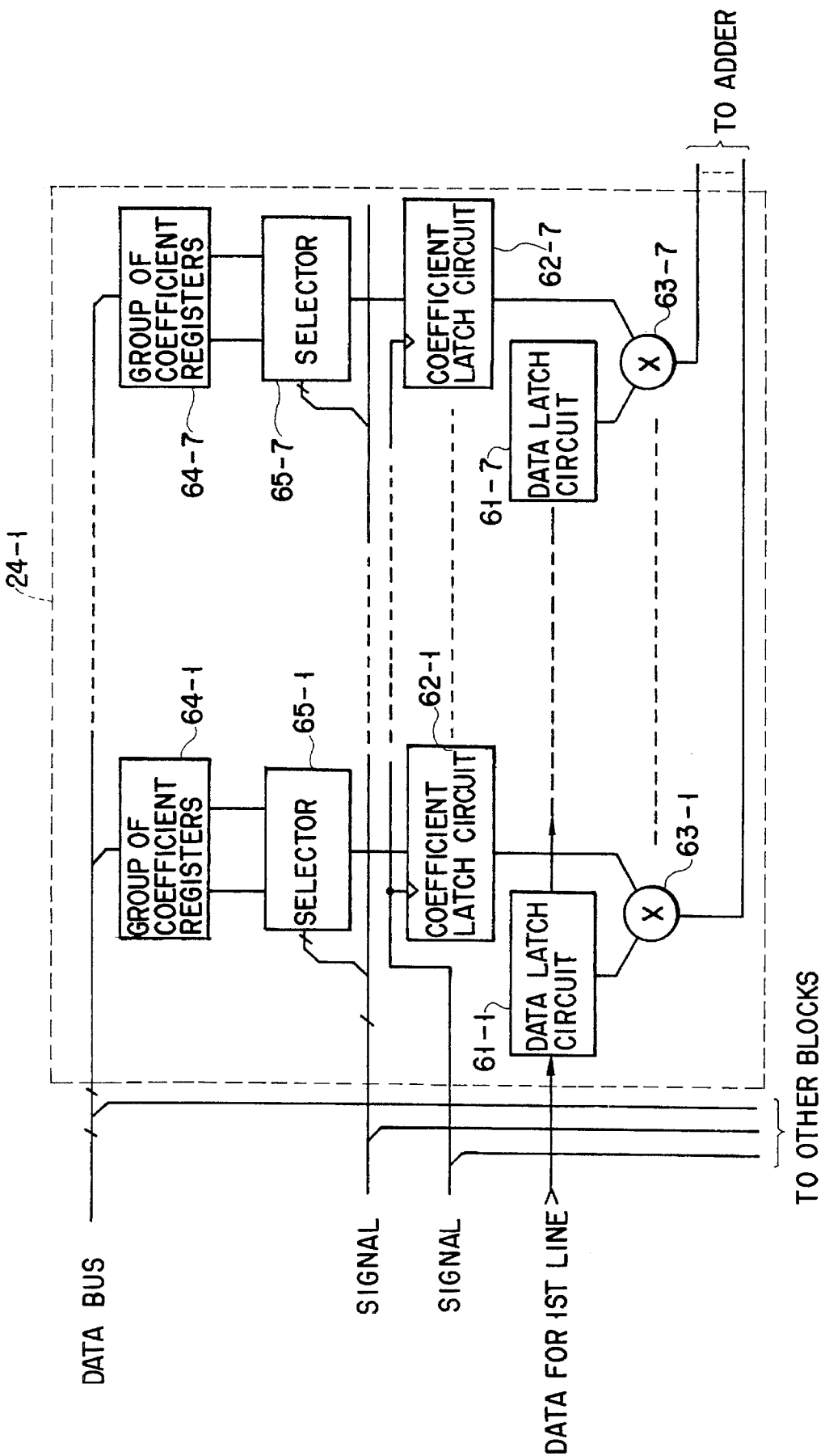
FIG. 23 is a diagram showing one of the blocks of the spatial filter unit.

FIGS. 22 and 23 show the spatial filter unit 215 in detail. The unit 215 is fundamentally identical in structure to the 5×5 spatial filter shown in FIGS. 2 and 3, except that its processing space has a 7×7 size. That is the spatial filter unit comprises first to seventh blocks 24-1 to 24-7, an adder 30, coefficient registers 56, a selector 57, and a coefficient latch circuit 58. The coefficient registers 56 are used to make a carry in the adder 30. The first to seventh blocks 24-1 to 24-7 have the same structure illustrated in FIG. 23. More specifically, each block comprises seven data latch circuits 61-1 to 61-7 connected in series, forming one line; seven coefficient latch circuits 62- to 62-7, each provided for one data latch circuit; seven multipliers 63-1 to 63-7, each for multiplying the data item stored in one data latch circuit 61 by the coefficient stored in the coefficient latch circuit 62 associated with the latch circuit 61; seven coefficient register groups 64-1 to 64-7; and seven selectors 65-1 to 65-7, each connected between one coefficient latch circuit 62 and the coefficient register group associated 64 with the latch circuit 62. The components of each block are identical in function to those of the 5×5 spatial filter shown in FIGS. 2 and 3. The coefficient register groups of all blocks constitute a register section. The selectors of all blocks constitute a selector section. Each selector 65 selects one of the filtering coefficients stored in one register included in the coefficient register group 64 associated with the selector 65, in accordance with a coefficient-selecting signal supplied from the comparator section 216.

The produces (each, a pixel value multiplied by a filtering coefficient) output from the multipliers 63 incorporated in each block of the spatial filtering section 219 are added by the adder 30. The pixel value consists of the brightness L* and chroma S of an input image data (i.e., a pixel).

How the image processing apparatus shown in FIG. 20, which is the fourth embodiment of the invention, operates will now be explained.

First, the CPU 220 sets filtering coefficients in each coefficient register of any group 64. Various angles θ for determining coefficient-selecting signals are set in the comparator section 216.

Next, the color image is input, pixel by pixel, as an input image from the camera 211 to the A/D converter 212. The converter 212 converts the input image into R signal, G and B signals. The Lab converting section 213 converts the R, G and B signals into three stimulus values X, Y and Z of the CIE color system, in accordance with the following equation (1):

$$\begin{bmatrix} X \\ Y \\ Z \end{bmatrix} = \begin{bmatrix} 0.6067 & 0.1736 & 0.2001 \\ 0.2988 & 0.5868 & 0.1144 \\ 0.0000 & 0.0661 & 1.1150 \end{bmatrix} \begin{bmatrix} R \\ G \\ B \end{bmatrix} \quad (1)$$

Further, the Lab converting section 213 converts the stimulus values X, Y and Z to a uniform perceptual space (OK?) of the L*a*b* color system, in accordance with the following equations (2):

$$L^* = 116(Y/Y0)^{1/3} - 16 \quad (2)$$

$$a^* = 500((X/X0)^{1/3} - (Y/Y0)^{1/3})$$

$$b^* = 200((Y/Y0)^{1/3} - (Z/Z0)^{1/3})$$
$$X0 = 98.072 \quad Y0 = 100.000$$
$$Z0 = 118.225$$

$$S = \sqrt{((a^*)^2 + (b^*)^2)}$$
$$\tan\theta = b^*/a^*$$

The brightness L* and chroma S of each input pixel, which the Lab converting section 213 has generated, is input via the delay section 214 to the first spatial filter unit 215-1 and the second spatial filter unit 215-2, respectively. The hue parameter tanθ (=b*/a*), which corresponds to the hue, is supplied from the Lab converting section 213 to the brightness comparator 216-1 and also to the chroma comparator 216-2.

Figure 24:
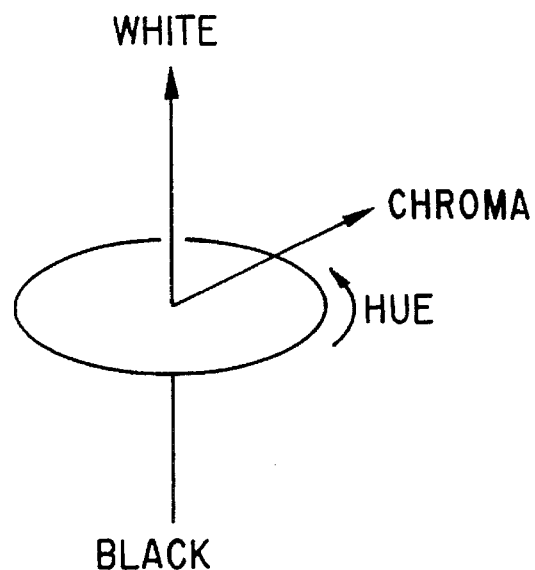
FIG. 24 is a diagram representing the correlation among brightness, chroma and hue.
Figure 25:
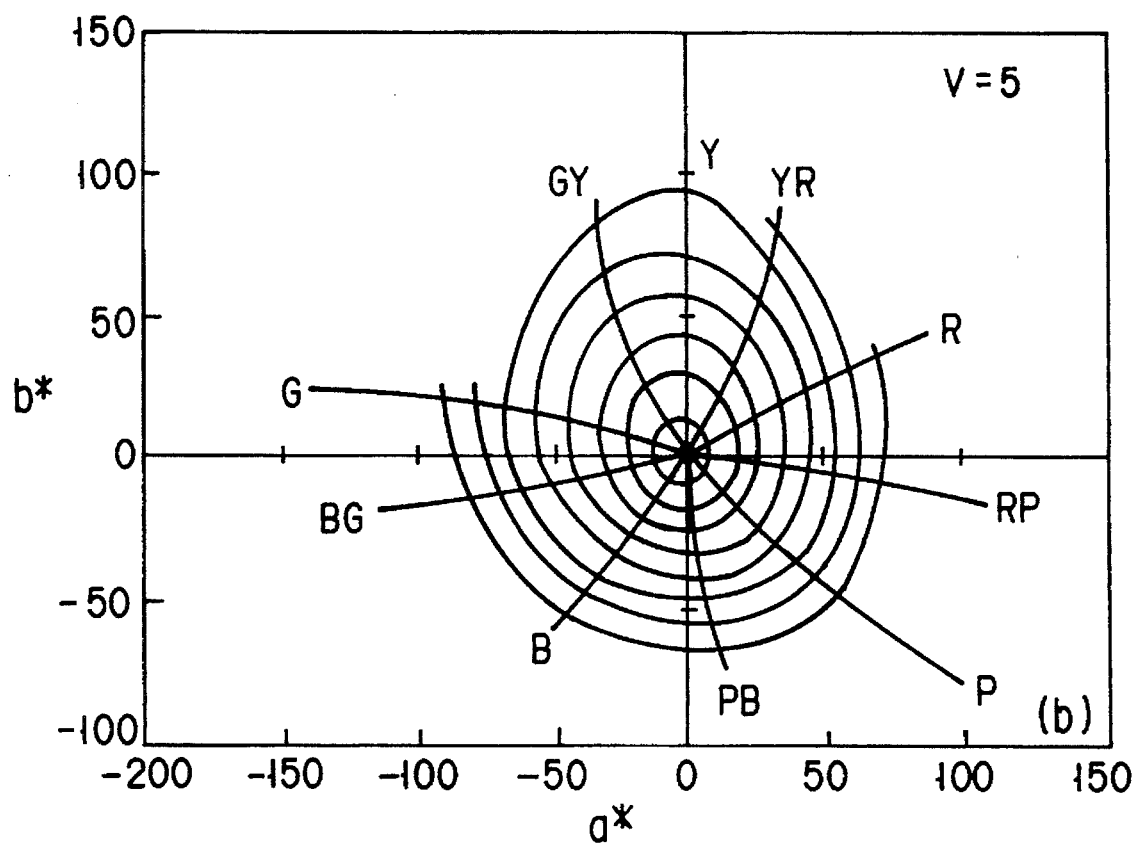
FIG. 25 is a diagram showing hue and chroma in Munsell color system.

The brightness, the chroma and the hue, i.e., the three attributes of color, are regularly correlated in a three-dimensional space as illustrated in FIG. 24. All colors are arranged in this space, and appropriate numbers are assigned to these colors, formulating a system known as Munsell color system. FIG. 24 is a graph showing the equi-hue curve and the contour line of chroma for a certain brightness (V=5) plotted in the Munsell color system drawn in CIE1976 color space L*a*b*.

As shown in FIG. 24, the hue of the input pixel is represented by tanθ (=b*/a*). Therefore, tanθ (=b*/a*) is applied as hue parameter in the present embodiment. A reference value properly selected based on a particular hue is set in the comparator section 216, thereby generating a coefficient-selecting signal for that hue. In other words, a filtering coefficient can be set for a particular hue of the input pixel.

For example, if reference values are set in the comparator section 216 for tan 0° to tan 360°, coefficient-selecting signals will be generated for all hues, whereby 7×7 filtering coefficients (=7 rows×7 columns) are set again for each hue. This makes it possible to set filtering coefficients for each color of the input image, which are different from those for any other color of the input image.

The comparator section 216, which has determined the hue of the input image, supplies the coefficient-selecting signals to the selectors 65 of all blocks. Each selector 65 is designed to select a specific register in accordance with an coefficient-selecting signal input from the comparator section 216. Upon receipt of a coefficient-selecting signal, each selector reads a filtering coefficient stored in the associated register. The filtering coefficient is set in the associated coefficient latch circuit 62 incorporated in the spatial filtering section 219. The coefficient latch circuit 62 sets the filtering coefficient in the associated multiplier 63.

The filtering coefficients read from all registers are set in all multipliers 63, respectively, in the same way. Thus, every time the Lab converting section 213 converts the input image, the comparator section 216 determines the hue of the input image. A coefficient-selecting signal corresponding is thereby output, and the 7×7 filtering coefficients are changed in the spatial filtering section 219.

Signals L*' and S' obtained for each hue by means of filtering process using specific filtering coefficient are converted into signals R', G' and B' by the RGB converting section 221, in accordance with the following equations (3) and (4):

$$X'=X0((L^*+16)/116+a^*/500)^3$$

$$Y'=Y0((L^*+16)/116)^3$$

$$Z'=Z0((L^*+16)/116-b^*/200)^3 \quad (3)$$

$$\begin{bmatrix} R' \\ G' \\ B' \end{bmatrix} = \begin{bmatrix} 1.9106 & -0.5326 & 0.2883 \\ -0.9843 & 1.9984 & -0.0283 \\ 0.0584 & -0.1185 & 0.8985 \end{bmatrix} \begin{bmatrix} X' \\ Y' \\ Z' \end{bmatrix} \quad (4)$$

In the present embodiment, the input image is processed, thereby determining its hue, its chroma and its brightness as described above. A reference value is set in the comparator section 216 for the hue of the input image. The filtering coefficients are changed in the spatial filter in accordance with the filtering coefficient output from the comparator section 216. Therefore, the filtering scheme can be switched for the hue of each input image, and the filtering process can be effected without impairing the information the original image has for each color.

Furthermore, since CIE1976 uniform perceptual space L*a*b* greatly resembles Munsell color system in which the colors which man can recognize are arranged, the changes in hue and brightness occurring in CIE1976 color space L*a*b* can be well perceived by human being. The present embodiment can therefore correct the hue and brightness of a color, in compliance with the characteristic of human visual perception.

In the fourth embodiment described above, the input image is converted to the L*a*b* color system which is a system of colors perceivable by man and which pertains to CIE1976 color space L*a*b*. Instead the input image may be converted to Lab color system or L*u*v* color system, which are also systems of colors man can perceive. In this case, too, a signal corresponding to a hue is input to the comparator section, and the comparator section generates a coefficient-selecting signal.

Alternatively, the R, G and B signals generated from the input image may be converted to XYZ color system or RGB color system, either being a psychophysical color system.

To convert the input image to the XYZ color system, Y corresponds to brightness L*, $\{(X^2+Z^2)\}^{1/2}$ to chroma, and Z/X to tan θ. That is, Z/X is used as a hue parameter to select a filtering coefficient.

Besides the R, G and B signals, an NTSC signal consisting of a luminance signal and a color-difference signal can be filtered for each hue, in the same way as in the embodiment described above. In this case, the color-difference signal is subjected to polar coordinates conversion, thereby obtaining two signals which correspond to chroma and hue, respectively. The signal which corresponds to the chroma is input to the spatial filter, in the form of a pixel matrix, and the filtering coefficient to be set in the spatial filter is determined from the signal which corresponds to the hue. The output of the spatial filter is converted into the original color image signal by means of conversion which is reverse to the polar coordinate conversion.

The gradation of an input image is generally corrected by uniformly changing luminance distribution, ranging from low luminance to high luminance. In the case of an input image having the luminance distribution shown in FIG. 38A, the direct-current component is taken from the image signal (FIG. 38B), and the effective-luminance range R of the image signal is multiplied, thereby generating an image signal whose luminance change is emphasized (FIG. 38C).

The sensitivity which man has to luminance is logarithmic. The lower the luminance, the more sensitive man is to luminance changes. As indicated above, the gradation of an input image is generally corrected uniformly, from low luminance to high luminance. If the gradation correction is performed with respect to a low-luminance part of the image, a high-luminance part of the image will not have desirable gradation. Conversely, if the gradation correction is performed with respect to a high-luminance part of the image, noise will be emphasized in a low-luminance part of the image.

An image-processing method is known in which each brightness value of an input image is converted to a given value by using a look-up table, thereby making it possible to achieve, for example, logarithmic density conversion possible. If the brightness value is converted to a given value by using the look-up table, however, necessary image data will also be converted non-linearly, and cannot be maintained at all.

An image processing apparatus according to the fifth embodiment of the invention will be described which can correct gradation in compliance with the characteristic of human visual perception and which has a given filtering effect.

FIG. 27 is a function block diagram showing an image processing apparatus which is a fifth embodiment;

In the image processing apparatus of this embodiment, the image signal representing the image of an object, taken by a camera 211, is supplied to an A/D converter 212, which converts the luminance signal contained in the image signal to a digital image signal. The digital image signal is input via a delay section 214 to a spatial filter unit 215. The luminance signal contained in the image signal, which has been output from the A/D converter 212, is supplied to one input terminal of a comparator 216.

A reference value is supplied to the other input terminal of the comparator 216. The comparator 216 compares the reference value with the value (luminance) of the luminance signal and inputs the difference between the two values to the spatial filter unit 215.

The delay section 214 reforms its function, outputting luminance signals, in parallel, for seven pixels of each column, for consecutive seven lines of the input image. The delay section 214 supplies the image signal to a spatial filtering section 219 at the same time the coefficient signal corresponding to the luminance determined by the comparator 216 is output to the spatial filtering section 219.

The spatial filter unit 215 comprises the filtering section 219 for performing spatial filtering, a plurality of register groups 64 each consisting of the first register 217-1 and the second register 217-2, and selectors 65.

The output of the spatial filter unit 215 is supplied through a D/A converter 222 to a display 223. The image signal output from the camera 211 is input to a sync signal separating circuit 224, which separates a sync signal from the image signal. The sync signal is supplied to a PLL 225, which generates a timing control signal from the sync signal. The timing control signal is supplied to the A/D converter 212, the delay section 214, the spatial filtering section 219, and the D/A converter 222, whereby these components operating in synchronization with one another.

The spatial filter unit 215 has the same structure as the spatial filter shown in FIGS. 22 and 23 which has a 7×7 matrix size. The unit 215 will not, therefore, described in detail.

In the present embodiment, each register group 64 of any one of the blocks 24-1 to 24-7 is constituted by the first register 271-1 and the second register 271-2. That is, two registers 271-1 and 271-2 form one register group 64. In FIG. 27, only one register group is shown in FIG. 27, and the other register groups are not illustrated.

In this embodiment, a coefficient signal suitable for use in correcting the gradation of a low-luminance part of the input image is set in the first register 271-1, whereas a coefficient signal suitable for use in correcting the gradation of a high-luminance part of the input image is set in the second register 271-2. These coefficient signals are supplied to the registers from a CPU 220 through a data bus.

Selectors 65-1 to 65-7 are provided for each register group incorporated in any one of the blocks 24-1 to 24-7. In FIG. 27, only one selector 218 is shown, and the other selectors are not illustrated. The selectors 65-1 to 65-7 are connected to the register groups 64-1 to 64-7, respectively. Each of these selectors selects the coefficient set in the first register of the associated group, or the coefficient set in the second register thereof, in accordance with the signal output from the comparator 216.

The coefficients the selectors 65-1 to 65-7 have selected are supplied to multipliers 63-1 to 63-7 through coefficient latch circuits 62-1 to 62-7 which are connected to the selectors 65-1 to 65-7, respectively.

Of the two registers of each of the second to seventh block 24-2 to 24-7 has a coefficient register group which is comprised of the first and second registers. A coefficient for correcting the gradation of a low-luminance part of the input image is set in the first register, and a coefficient signal for correcting the gradation of a high-luminance part of the input image is set in the second register. One of these coefficients is selected by the selector associated with the register group, which has received a signal from the comparator. The coefficient, thus selected, is supplied to the multiplier associated with the selector.

Since the comparator 216 outputs the result of comparison, pertaining to each pixel of the input image, the spatial filter unit 215 can change at least 7×7 coefficients for every pixel.

The products (each, pixel value multiplied by a coefficient) output from the multipliers 63-1 to 63-7 of the blocks 24-1 to 24-7 are added by an adder 30.

The sum of the products, obtained by the adder 30, may have a negative value, depending on the coefficients selected from the register groups 64. In the present embodiment, a carry is made on the sum so that the adder 30 may output a sum having a positive value only. To be more specific, various positive coefficients are stored in the coefficient register groups 56 which are connected to the data bus. A selector 57 selects one of the positive coefficients, and the selected positive coefficient is supplied to the adder 30 via a coefficient latch circuit 58 and is added to the sum which the adder 30 has already obtained.

The operation of the fifth embodiment will now be explained.

First, the CPU 220 supplies two coefficient signals suitable for correcting the gradation of a low-luminance part of the input image and that of a high-luminance part of the input image to the first register 271-1 and the second register 271-2. These coefficient signals are set into the first and second registers 271-1 and 271-2. Also, a reference value is supplied from the CPU 220 to the comparator 216 so that the comparator may determine whether the luminance of the input image is high or low.

Next, the signal output from the camera 211 and representing the input image is converted to a digital signal by the A/D converter 212. The luminance signal contained in the digital signal is supplied to the comparator 216 and compared with the reference value. If the luminance signal represents luminance greater than the reference value, it is determined that the input image has high luminance. If the luminance signal represents luminance less than the reference value, it is determined that the input image has low luminance.

The result of the comparison is supplied to the selectors 65. Each of the selectors 65 reads a coefficient signal from the first register 217-1 in the case where the comparison result shows that the input image has low luminance. The coefficient signal is supplied to the associated coefficient latch circuit of the spatial filtering section 219. The coefficient latch circuit supplies the corresponding coefficient to the associated multiplier. This sequence of operations is performed every time the comparator 216 outputs the comparison result for each pixel, whereby the 7×7 coefficients stored in the spatial filtering section 219 are changed. In the case where the comparison result shows that the input image has low luminance, each selector 65 reads a coefficient signal from the second register 217-2, and the coefficient signal is supplied to the spatial filtering section 219.

In this manner the coefficients in the spatial filtering section 219 are changed if the input image has low luminance or high luminance. Hence, the signal representing the luminance of a low-luminance part of the input image is subjected to gradation correction achieved based on a coefficient appropriate for the low-luminance part of the input image, while the signal representing the luminance of a high-luminance part of the input image is subjected to gradation correction achieved based on a coefficient appropriate for the high-luminance part of the input image. As a result of this, the display 228 displays a gradation-corrected image which has gradation adapted to the characteristic of human visual perception.

FIG. 28 represents the luminance distribution which an input image has before gradation is corrected, and the FIG. 29 the luminance distribution which the input image has after gradation has been corrected. As is seen from FIGS. 28 and 29, the filtering effected in this embodiment alters the luminance distribution in the low-luminance part in a specific way and the luminance in the high-luminance part in another way.

In the present embodiment, as indicated above, the coefficients in the spatial filtering section 219 can be changed in one way for the low-luminance part and in another way for the high-luminance part. The embodiment can therefore provide an image which has gradation adapted to the characteristic of human visual perception.

In the embodiment described above, coefficient signals are stored in the first register 217-1 so that the coefficients shown in FIG. 30 may be set, and the coefficients for high luminance are set in the second register 217-2 as in the embodiment described above.

The 7×7 coefficients shown in FIG. 30 serve not only to remove noise but also to emphasize the image. If set in the registers beforehand, the coefficients shown in FIG. 30 are applied, effecting smoothing to reduce the noise in a low-luminance part which is sensitive to changes in luminance and which has much noise. As a result, the S/N ratio can be increased. Optimal gradation correction is achieved on a high-luminance part in the same way as in the embodiment described above.

The coefficients stored in the first and second registers 217-1 and 217-2 are arbitrary ones. These coefficients may serve to various types of processing in addition to the gradation correction if they have appropriate values. If the coefficients are the coefficients shown in FIG. 30, they are used to accomplish smoothing to reduce noise.

Since one reference value is set in the comparator, the coefficients set for the low-luminance part differ from those set in the high-luminance part. If more reference values are set in the comparator, as many sets of coefficients will be used, making it possible to change the coefficients more minutely.

Figure 31:
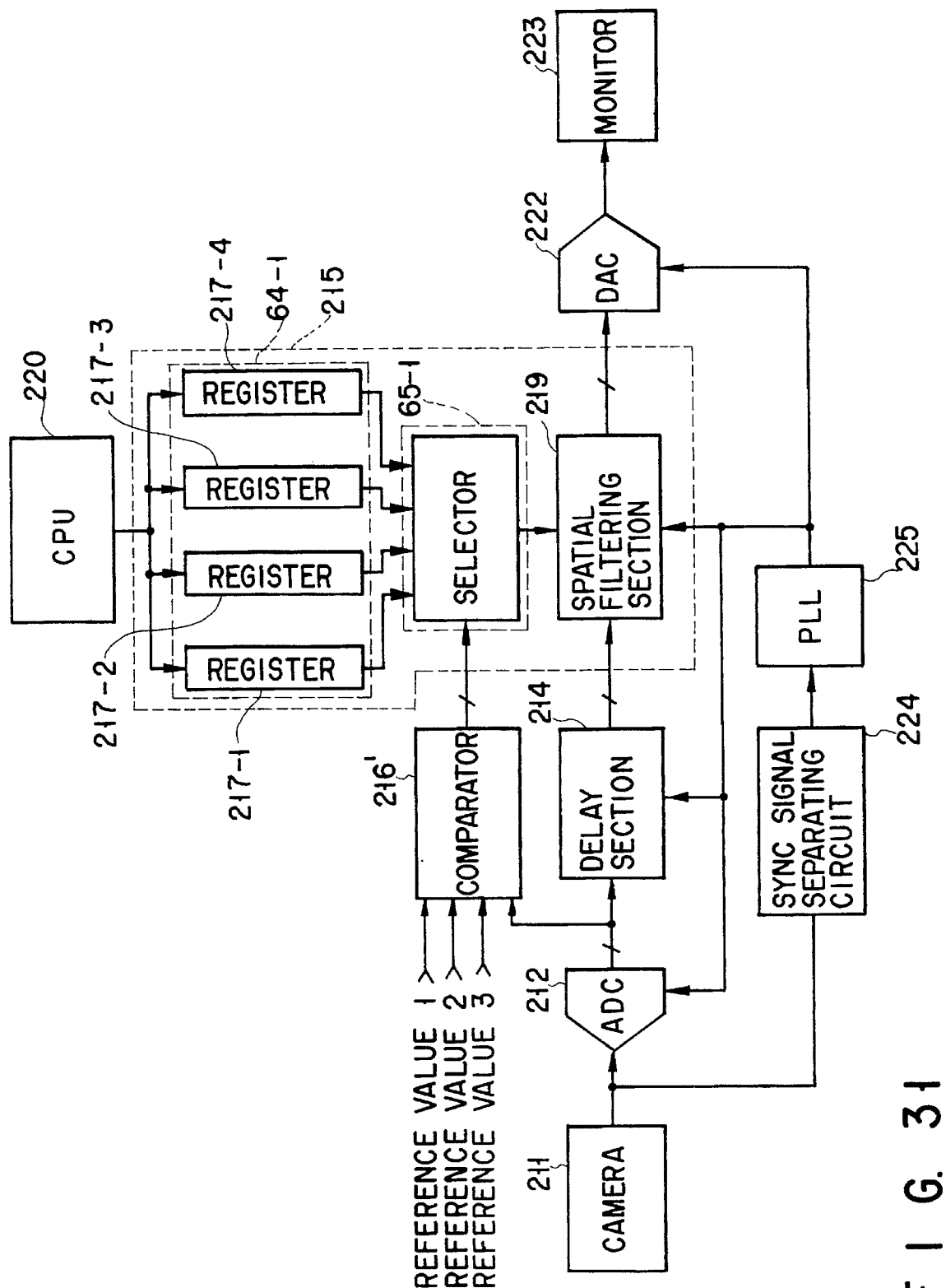
FIG. 31 is a function block diagram of a first modification of the image processing apparatus which is the fifth embodiment.

The sixth embodiment of the present invention will be described with reference to FIG. 31. In this embodiment, three reference values 1, 2 and 3 are set in a comparator 216', and a luminance signal is supplied to the comparator 216'. The comparator 216' outputs one of four different outputs in accordance with the luminance signal input. Each of coefficient register groups 64 consists of four registers 217-1, 217-2, 217-3 and 217-4. A selector 218' selects one of the registers registers 217-1, 217-2, 217-3 and 217-4 in accordance with the output from the comparator 216'. Except for these features, the embodiment is identical to the apparatus shown in FIG. 27. Therefore, the components identical to those of the apparatus shown in FIG. 27 are denoted at the same numerals and will not be described in detail.

For example, coefficients suitable for smoothing process are set in the first register 217-1, coefficients suitable for the gradation correction of a low-luminance part are set in the second register 217-2, coefficients suitable for the gradation correction of a low-luminance part are set in the third register 217-3, and coefficients suitable for gradation emphasis are set in the fourth register 217-4.

The first register 217-1 is selected for a part of the input image, which has luminance equal to or less than the reference value 1. The second register 217-2 is selected for a part of the input image, which has luminance equal ranging from the reference value 1 to the reference value 2. The third register 217-3 is selected for a part of the input image, which has luminance equal ranging from the reference value 2 to the reference value 3. The fourth register 217-43 is selected for a part of the input image, which has luminance greater than reference value 3.

In the present embodiment thus constructed, parts of the input image, each having different luminance, can be detected and corrected independently of one another. The embodiment can therefore correct the gradation more minutely than the embodiment described above.

FIG. 32 represents the luminance distribution present before gradation correction, and shows the positions the three reference values assume in the luminance distribution. FIG. 33 represents the luminance distribution present after the gradation correction. As shown in these two figures, the luminance distribution in each of the four regions defined by the three reference values has changed by the gradation correction.

In the embodiment described above, the reference values are supplied from a CPU 220 to the comparator 216'. Instead, as shown in FIG. 34, the luminance signal output from an A/D converter 212 may be supplied to a reference value generating section 90. In this case, the section 90 generates three reference values, which are supplied to the comparator 216''. The reference values which correspond to the luminance changes in the input image can be set, making it possible to correct the image more minutely.

Figure 35:
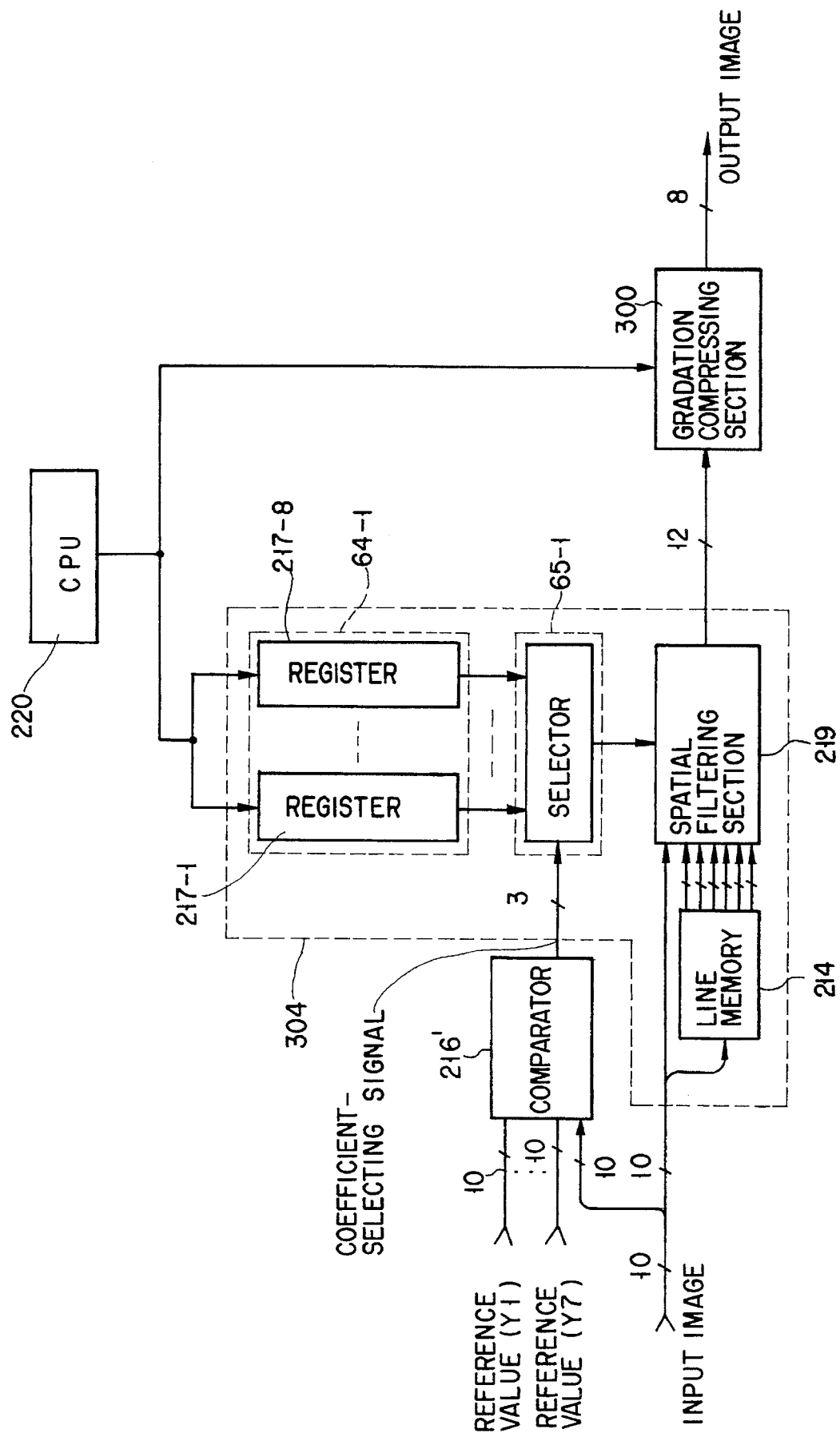
FIG. 35 is a diagram showing an image processing apparatus which is a sixth embodiment of the present invention.
Figure 39:
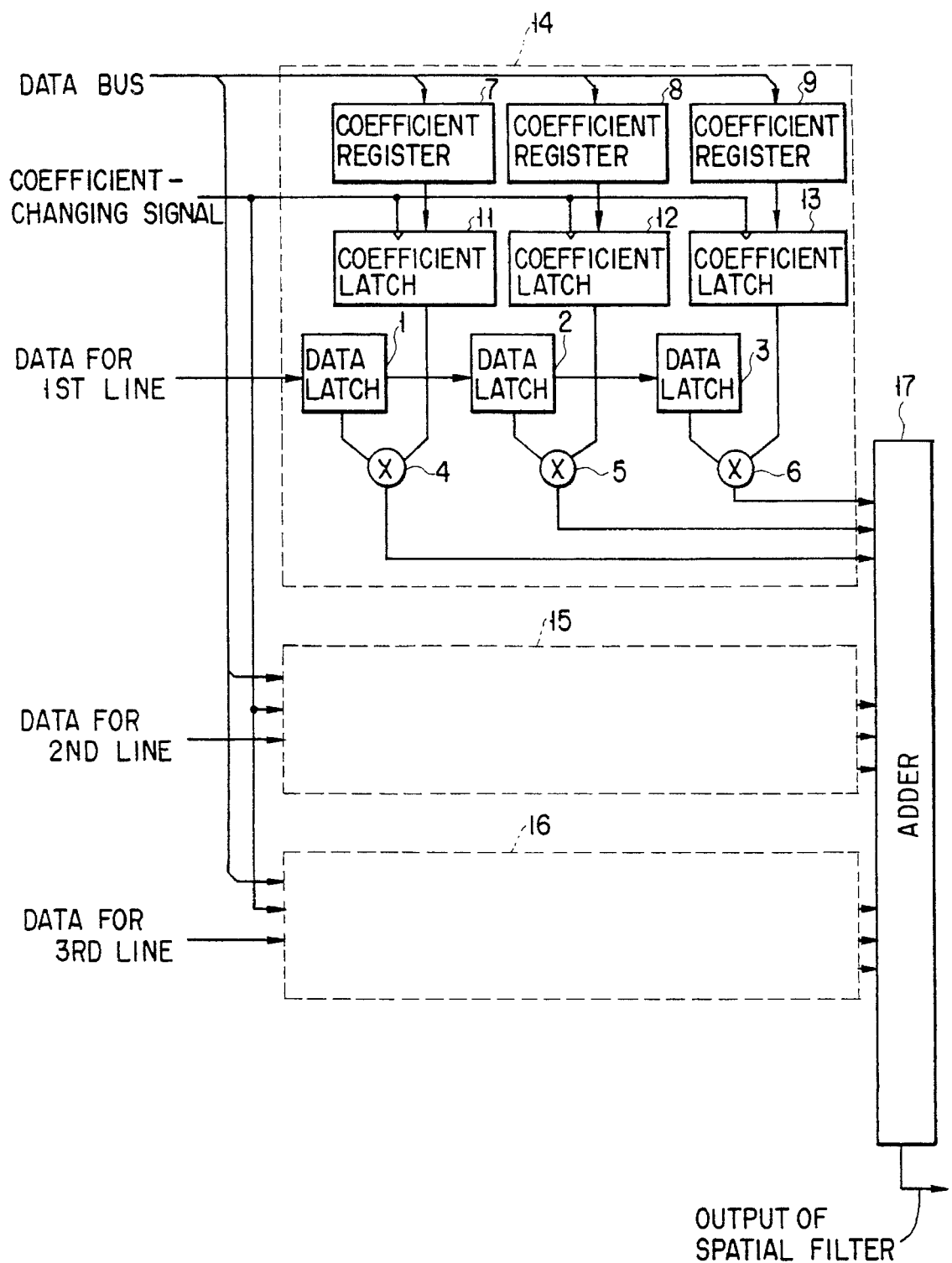
FIG. 39 is a diagram showing the spatial filter incorporated in the conventional image processing apparatus.

The seventh embodiment of the invention will be described with reference to FIG. 35. The components identical to those of the sixth embodiment described above are designated at the same numerals.

Seven reference values Y1 to Y7 for dividing a 10-bit gradation, luminance region into eight parts are set in a comparator 216'. The comparator 216' outputs the results of comparison (coefficient-selecting signals) which correspond to the luminance values an input image has. The results are supplied to a spatial filter unit 215.

The spatial filter unit 215 comprises seven blocks 24-1 to 24-7 as its counterpart used in the sixth embodiment. Each block has seven groups 64-1 to 64-7 of coefficient registers. Each register group consists of registers 217-1 to 217-8, which store coefficient signals, each for appropriately emphasizing the gradation of one of the eight part which the comparator 216 has formed by dividing the luminance region. In this embodiment, the coefficient signals are of such values that the gradation of any part having luminance equal to or less than Y1 (the lowest luminance) or equal to greater than Y7 (the highest luminance) is emphasized most, and the gradation of any part having luminance ranging from Y3 to Y5 is emphasized least.

Each block 24 has selectors 65-1 to 65-3 provided for the coefficient register groups 64-1 to 64-7. In FIG. 35, only the register group 64-1 and only the selector 65-1 are shown; the remaining register groups and the remaining selectors are not illustrated.

Each of the selectors 65-1 to 65-3 is connected to the registers 217-1 to 217-8 of the corresponding group 64. The selector selects one of the registers in accordance with a coefficient-selecting signal supplied from the comparator 216 and supplies the coefficient-selecting signal to the corresponding coefficient latch circuit 62 of a spatial filtering section 219. For example, when the selector receives the coefficient-selecting signal corresponding to the reference value Y1 supplied from the comparator 216', it reads coefficients from the registers 217 of each register group incorporated in each block. Similarly, the selector selects the registers 217-2 to 217-8 in accordance with the coefficient-selecting signals for Y2 to Y8, respectively. The identical register numbers, each belonging to one register group of each block, constitute one coefficient pattern.

The present embodiment comprises a gradation compressing section 300 connected to the output of the spatial filtering section 219. The section 300 compresses the 10-bit gradation to an 8-bit gradation.

The operation of this embodiment thus constructed will now be explained. The spatial filter unit 215 operates basically in the same way as its counterpart of the fifth embodiment. Only the different operations will be explained below.

An image signal is input to the spatial filtering section 219 and the delay section 214 comprising six line memories. The luminance signal of the input image is supplied to the comparator 216'. The comparator 216' compares the luminance value of the input image with the reference values Y1 to Y7, thereby detecting the luminance value of the input image, and outputs the coefficient-selecting signal corresponding to the luminance value detected.

Each selector 65 selects one of the coefficient registers of the associated group in accordance with the coefficient-selecting signal. For example, if the luminance of the input image has a value equal to or less than reference value Y1 or a value equal to or greater than the reference value Y7, the selector 65 selects the register which stores filtering coefficients (i.e., coefficient signals) for emphasizing gradation much. If the luminance of the input image has a value ranging from the reference value Y3 to the reference value Y5, the selector 65 selects the register which stores filtering coefficients (i.e., coefficient signals) for emphasizing gradation a little.

The coefficient signals selected in accordance with the luminance value of the input image, which form a 7×7 coefficient pattern, are supplied to the multipliers 63-1 to 63-7 of each block through the coefficient circuits 62-1 to 62-7. Since the comparator 216' outputs a coefficient-selecting signal for one pixel, 7×7 filtering coefficients are changed for each pixel in all blocks.

The products obtained by the multipliers 63 of each of the blocks 24-1 to 24-7 are supplied to the adder 30. The adder 30 adds the products.

For example, if the input image is a 10-bit gradation image of the type shown in FIG. 36A, the spatial filtering section 219 performs filtering, changing 7×7 coefficients in accordance with the luminance value of the input image. As a result, the parts of the image having different luminance values are corrected in terms of gradation to different degrees, and the signal representing the image will be gradation-emphasized in the high-luminance parts (having a luminance nearly equal to the tenth bit).

The output of the spatial filtering section 219 is input to the gradation compressing section 300. The section 300 stores such a conversion table as shown in FIG. 37. The conversion table is equivalent to a polygonal line formed by connecting seven inflection points representing the reference values Y1 to Y7 used in the comparator 216 to divide the luminance region into eight parts. The conversion table represents the compression ratios for the parts of the image. Of these compression ratios, those for the high-luminance part the low-luminance part are logarithmically greater than those for the luminance regions. Hence, the conversion table is adjusted to the characteristics of human visual perception. The conversion table is supplied from the CPU 220.

The output of the spatial filtering section 219 is compressed in terms of gradation in accordance with the conversion table illustrated in FIG. 37.

Generally, once the output of a spatial filtering section has been gradation-compressed in accordance with the conversion table shown in FIG. 37, the gradation information is distorted since the compression ratios for a low-luminance part and a high-luminance part are high. Nevertheless, the gradation information is not deteriorated in the present embodiment. This is because both the high-luminance part and the low-luminance part have been more gradation-emphasized than any other part. Therefore, the gradation compressing section 300 can output such an 8-bit gradation image signal as shown in FIG. 36C, without deteriorating the gradation information, by gradation-compressing the 10-bit gradation image signal.

Since the spatial filtering section 219 emphasizes the gradation of the input image signal in consideration of the characteristic of the conversion table, the present embodiment can gradation-compress the output of the section 219 without deteriorating the gradation information of the input image.

The filtering coefficients set in the spatial filtering section 219 are arbitrary ones, an low-luminance part of the input image and a high-luminance part thereof can be gradation-corrected to different degrees, thereby to emphasize the low-luminance part more greatly than the high-luminance part, so that both parts of the image may be adjusted to human visual perception.

Moreover, the filtering process may include some functions such as noise removing.

In the present embodiment, as described above in detail, the coefficients set in the spatial filter are changed in accordance with the luminance of the input image. Therefore, the gradation of the image can be corrected and adjusted to the characteristics of human visual perception, and an desirable filtering can be performed as well.

Since the coefficients set in the spatial filter are changed in accordance with the luminance of the input image, thereby compressing the gradation of the output of the filter, the degree of gradation compression can be changed based on the luminance of the input image. Hence, the output of the filter can be gradation-compressed, without deteriorating the gradation information which the input image has.

The present invention is not limited to the embodiments described above. Various changes and modifications can be made without departing from the scope and spirit of the invention.

We claim:

1. An image processing apparatus for performing spatial processing on an input image, the apparatus comprising:

spatial filtering means storing coefficients arranged in i rows and j columns, for receiving pixel data items representing the input image and arranged in i rows and j columns, and multiplying each pixel data item by a corresponding coefficient, thereby to perform spatial filtering, thus extracting a particular frequency component of the input image;

coefficient storing means having a plurality of register groups corresponding to i×j coefficient to be set in said spatial filtering means, each of said register groups having a plurality of coefficient registers each of which stores a numerical value that is one of candidates for a coefficient;

selection data generating means for generating coefficient-selecting data designating the coefficient registers of each register group and changing the coefficient-selecting data in accordance with the pixel data items which is to be input to said spatial filtering means; and coefficient selecting means for receiving the coefficient-selecting data generated by said selecting data generating means, reading numerical values from the coefficients registers of each register group in accordance with the coefficient-selecting data, and setting the numerical values in said spatial filtering means as the coefficients.

2. The image processing apparatus according to claim 1, wherein:

said selecting data generating means includes coefficient information storing means and coefficient reading means;

said coefficient information storing means stores a plurality of coefficient-selecting data items, each of which is provided for at least one pixel of a spatial region of the input image; and said coefficient reading means reads the coefficient-selecting data item corresponding to a pixel data item to be processed by said spatial filtering means, from said coefficient storing means at the same time the input image is supplied to said spatial filter means.

3. The image processing apparatus according to claim 1, wherein:

said spatial filtering means has i×j pixel data holding sections for holding pixel data items, i×j coefficient holding sections for holding coefficients, i×j multiplying sections, and an adder section for adding data items output from the multiplying sections;

said pixel data holding sections form i parallel lines, each having j pixel data holding sections connected in series such that a pixel data item input to a pixel data holding section provided at an input end of each line is transferred sequentially to adjacent pixel data holding sections of the same line;

said coefficient holding sections are connected to the corresponding groups of coefficient registers, respectively, and associated with said pixel data holding sections, respectively, for holding the coefficients which have been read from said groups of coefficient registers by said coefficient selecting means; and said multiplying sections are associated with said pixel data holding sections and said coefficient holding sections, respectively, for multiplying the pixel data item stored in each of said pixel data holding sections by the coefficient held in the coefficient holding section associated with the pixel data holding section.

4. The image processing apparatus according to claim 3, wherein:

(i−1) line buffers for delaying the input image by one line are connected to inputs of the pixel data holding sections provided at the input ends of said lines, respectively; and pixel data items forming a row are input to the pixel data holding sections provided at the input ends of said lines.

5. The image processing apparatus according to claim 2, wherein said coefficient information storing means has a frame memory which has a storage capacity corresponding to the input image and which stores the coefficient-selecting data items at addresses corresponding to the pixels forming the input image.

6. The image processing apparatus according to claim 1, further comprising:

clock signal generating means for supplying operation clock signals to said spatial filtering means, thereby to cause said spatial filtering means to perform spatial filtering, and for changing operation clock signals supplied to said spatial filtering means in accordance with a ratio at which to enlarge or reduce pixel data which said spatial filtering means is to process;

memory means for storing results of the process performed by said spatial filtering means; and control means for controlling writing of pixel data into, and reading of pixel data from, said memory means, wherein said spatial filtering means sets again the coefficients arranged in i rows and j columns, in synchronization with the operation clock signals, multiplies those of the pixel data items arranged in i rows and j columns which are required for interpolation, by the coefficients corresponding to the pixel data items, and adds these pixel data items, thereby generating new interpolated data representing one pixel.

7. The image processing apparatus according to claim 6, wherein:

said coefficient storing means stores a plurality of coefficient patterns for use in enlarging the image;

said clock signal generating means generates high-speed clock signals when the pixel data items to be processed by said spatial filtering means belongs to an image region to be enlarged, said high-speed clock signals corresponding to a ratio at which to enlarge that image region;

said selecting data generating means has coefficient information storing means storing a plurality of image-enlarging coefficient-selecting data items for sequentially setting the plurality of coefficient patterns for use in enlarging the image, for that region of the input image which is to be enlarged, and reads the image-enlarging coefficient-selecting data items sequentially from said coefficient information storing means in synchronization with the high-speed operation clock signals; and said spatial filtering means performs filtering in accordance with the coefficient patterns in synchronization with the high-speed operation clock signals.

8. The image processing apparatus according to claim 6, wherein:

said clock signal generating means generates low-speed operating clock signals when the pixel data items to be processed by said spatial filtering means belongs to an image region to be reduced, said low-speed clock signals corresponding to a ratio at which to reduce that image region;

said spatial filtering means performs filtering in synchronization with the low-speed operation clock signals, thereby interpolating a number of pixel data items which are required to display one line of a reduced image; and said control means writes into said memory means interpolated line data corresponding to the ratio at which to reduce the image region.

9. The image processing apparatus according to claim 6, wherein:

said clock signal generating means generates low-speed operating clock signals when the pixel data items to be processed by said spatial filtering means belongs to an image region to be reduced, said low-speed clock signals corresponding to a ratio at which to reduce that image region;

said spatial filtering means performs filtering in synchronization with the low-speed operation clock signals, thereby interpolating a number of pixel data items which are required to display one line of a reduced image; and said control means writes into said memory means all interpolated line data items output from said spatial filtering means and reads some of the interpolated line data items from said memory means, while removing the remaining interpolated line data items in accordance with the ratio at which to reduce the image region.

10. The image processing apparatus according to claim 6, wherein:

said clock signal generating means generates normal-speed operating clock signals when the pixel data items to be processed by said spatial filtering means belongs to an image region to be reduced; and said control means writes into said memory means some of interpolated data items output from said spatial filtering means, while removing the remaining interpolated data items in accordance with the ratio at which to reduce the image region.

11. The image processing apparatus according to claim 6, wherein:

said clock signal generating means generates normal-speed operating clock signals when the pixel data items to be processed by said spatial filtering means belongs to an image region to be reduced; and said control means writes interpolated data items output from said spatial filtering means into said memory means, without removing any one of the interpolated data items, and reads some of the interpolated data items from said memory means, while removing the remaining interpolated line data items in accordance with the ratio at which to reduce the image region.

12. The image processing apparatus according to claim 1, further comprising:

a first image memory for storing an input image to be processed;

a memory controller for reading from said first image memory pixel data items representing the input image, and repeatedly reading those of the pixel data items belonging to an image region to be enlarged or reduced which define the same line, in accordance with a ratio at which to enlarge or reduce that image region;

clock signal generating means for changing operation clock signals to be supplied to said spatial filtering means, in accordance with the ratio at which to enlarge or reduce that image region, when the pixel data items to be processed by said spatial filtering means belongs to that image region; and a second image memory for storing the input image which has been enlarged or reduced by said spatial filtering means.

13. The image processing apparatus according to claim 1, further comprising:

a first image memory for storing an input image to be processed;

a first memory controller for reading pixel data items representing the input image, from said first image memory;

a second image memory for storing the input image processed by said spatial filtering means; and a second memory controller for writing pixel data items output from said spatial filtering means, to predetermined addresses in said second image memory, and for writing some of the pixel data items into said second image memory, while removing the remaining pixel data items in accordance with a ratio at which to enlarge or reduce the input image.

14. The image processing apparatus according to claim 1, further comprising:

a first conversion means for converting a color image signal of an input image to a colorimetric system signal; and a second conversion means for converting pixel data obtained by filtering the colorimetric system signal by means of said spatial filtering means, into the original color image signal, wherein said spatial filtering means receives the colorimetric system signal from said first conversion means, in the form of pixel data items arranged in i rows and j columns, and said selection data generating means generates coefficient-selecting data in accordance with a hue parameter which changes based on the hue of the input image represented by the colorimetric system signal output from said first conversion means.

15. The image processing apparatus according to claim 1, further comprising:

a first conversion means for converting a color image signal of an input image to a uniform perceptual space signal; and a second conversion means for converting pixel data obtained by filtering the uniform perceptual space signal by means of said spatial filtering means, into the original color image signal, wherein said spatial filtering means receives the uniform perceptual space signal from said first conversion means, in the form of pixel data items arranged in i rows and j columns, and said selection data generating means reads the coefficient-selecting data in accordance with a hue parameter which changes based on those of pixel data items which forms the uniform perceptual space signal by said first conversion means.

16. The image processing apparatus according to claim 1, further comprising:

a first conversion means for performing polar coordinate conversion on a color-different signal contained in a color image signal representing an input image; and a second conversion means for converting pixel data obtained by said spatial filtering means, into an original color image signal, wherein said spatial filtering means receives the pixel data items from said first conversion means, in the form of pixel data items arranged in i rows and j columns, and said selection data generating means generates coefficient-selecting data in accordance with a hue parameter which changes based on a hue parameter contained in the pixel data subjected to the polar coordinate conversion in said first conversion means.

17. The image processing apparatus according to claim 14, wherein:

said spatial filtering means has a first filtering section for receiving pixel data which is brightness data contained in the colorimetric system signal output from said first conversion means, and pixel data which is a second filtering section for receiving chroma data contained in the colorimetric system signal output from said first conversion means; and said selecting data generating means compares a plurality of preset reference values with the hue parameter output from said first conversion means, thereby to generate coefficient-selecting data based on the reference value more similar to the hue parameter than any other reference value.

18. The image processing apparatus according to claim 17, wherein said selecting data generating means comprises a first comparator for comparing the preset reference values with the hue parameter output from said first conversion means, thereby to generate coefficient-selecting data designating a coefficient pattern to be set in the first spatial filtering section, and a second comparator for comparing the preset reference values with the hue parameter output from said first conversion means, thereby to coefficient-selecting data designating a coefficient pattern to be set in the second spatial filtering section.

19. The image processing apparatus according to claim 1, wherein said selecting data generating means comprises comparator means for comparing at least one reference value with a luminance value of pixel data to be input to said spatial filtering means, and coefficient memory means storing coefficient-selecting data representing a coefficient pattern optimal for a high-luminance part of the input image and coefficient-selecting data representing a coefficient pattern optimal for a low-luminance part of the input image, and is designed to generate coefficient data for the high-luminance or low-luminance part of the input image in accordance with the result of comparison performed by said comparator means.

20. The image processing apparatus according to claim 19, further comprising reference value generating means for detecting a luminance value of the input image and supplying said comparator means with a reference value corresponding to the luminance value detected.

21. The image processing apparatus according to claim 1, further comprising gradation compressing means for performing gradation compression on the pixel data output from said spatial filtering means, and wherein said selecting data generating means has comparator means for comparing at least one preset reference value with a luminance value of the pixel data to be input to said spatial filtering means.

22. The image processing apparatus according to claim 21, wherein said gradation compression means compresses the high-luminance and low-luminance parts of the input image to a greater degree than any other part of the input image.

* * * * *